(12) United States Patent
Sievers et al.

(10) Patent No.: US 12,011,736 B2
(45) Date of Patent: Jun. 18, 2024

(54) METHODS AND SYSTEMS FOR LARGE AREA AND LOW DEFECT MONOLAYER ORDERING OF MICROSPHERES AND NANOSPHERES

(71) Applicant: The Board of Trustees of the University of Illinois, Urbana, IL (US)

(72) Inventors: Dane Sievers, Fisher, IL (US); Sartaj Grewal, Champaign, IL (US); Lukas Janavicius, Champaign, IL (US); Julian Michaels, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 17/558,996

(22) Filed: Dec. 22, 2021

(65) Prior Publication Data
US 2022/0193718 A1    Jun. 23, 2022

Related U.S. Application Data

(60) Provisional application No. 63/129,434, filed on Dec. 22, 2020.

(51) Int. Cl.
*B05D 1/20* (2006.01)
*B05C 3/05* (2006.01)
(Continued)

(52) U.S. Cl.
CPC ............. *B05D 1/204* (2013.01); *B05C 3/05* (2013.01); *B05C 11/028* (2013.01); *B05C 11/11* (2013.01); *B05D 1/208* (2013.01); *C09D 125/06* (2013.01); *B82Y 30/00* (2013.01); *B82Y 40/00* (2013.01)

(58) Field of Classification Search
CPC ........ B05D 1/002; B05D 1/005; B05D 1/202; B05D 1/204; B05D 1/26; B05D 1/30; B05D 3/0406; B05D 3/12
See application file for complete search history.

(56) References Cited

U.S. PATENT DOCUMENTS

| 4,407,695 A | 10/1983 | Deckman |
| 6,284,310 B2 | 9/2001 | Picard |
| (Continued) | | |

FOREIGN PATENT DOCUMENTS

| CN | 105947970 A | 9/2016 |
| CN | 106220237 A | 12/2016 |

OTHER PUBLICATIONS

Bagheri, Payam, et al. "Quantitative metrics for assessing positional and orientational order in colloidal crystals." Langmuir 31.30 (2015): 8251-8259.

(Continued)

*Primary Examiner* — Michael P Wieczorek
(74) *Attorney, Agent, or Firm* — McDonnell Boehnen Hulbert & Berghoff LLP

(57) ABSTRACT

In an example, a method including dispensing a liquid onto a first portion of a surface of a substrate and dispensing a solution comprising colloidal spheres onto a second portion of the surface of the substrate. The method additionally includes agitating the colloidal spheres to disperse the colloidal spheres along the first portion and the second portion of the surface of the substrate and directing air flow above the colloidal spheres inducing rotation of the colloidal spheres. In another example, a method includes positioning a retaining ring on a surface of a liquid above a substrate below the surface of the liquid and dispensing a solution comprising colloidal spheres onto the surface of the liquid within a surface area of the retaining ring. The method further includes agitating the surface of the liquid and the colloidal spheres to disperse the colloidal spheres along the surface area of the retaining ring.

12 Claims, 13 Drawing Sheets

(51) Int. Cl.
  *B05C 11/02* (2006.01)
  *B05C 11/11* (2006.01)
  *B82Y 40/00* (2011.01)
  *C09D 125/06* (2006.01)
  *B82Y 30/00* (2011.01)

(56) References Cited

U.S. PATENT DOCUMENTS

| | | | |
|---|---|---|---|
| 6,495,296 B1 * | 12/2002 | Wells | H10K 71/166 430/5 |
| 8,501,020 B2 | 8/2013 | Zhu | |
| 9,090,987 B2 * | 7/2015 | Quint | H01L 21/31144 |
| 9,321,920 B2 | 4/2016 | Fontana | |
| 2009/0169807 A1 | 7/2009 | Yang | |
| 2013/0327392 A1 * | 12/2013 | Weitekamp | C30B 29/60 428/206 |
| 2018/0309109 A1 | 10/2018 | Kim | |
| 2019/0064074 A1 | 2/2019 | Ragan | |

OTHER PUBLICATIONS

Bayat, Farzaneh, et al. "Optimizing the concentration of colloidal suspensions in convective assembly of centimeter-sized uniform monolayer colloidal crystals." Applied Surface Science 434 (2018): 898-904.
Bekeris, Michael, et al. "Rapid Quantification of Nanosphere Lithography Packing Defects Using Scanning Electron Microscopy Edge Effects." physica status solidi (RRL)-Rapid Research Letters, Date: 2020.
Blanc, Christophe, et al. "Capillary force on a micrometric sphere trapped at a fluid interface exhibiting arbitrary curvature gradients." Physical review letters 111.5 (2013): 058302.
Canalejas-Tejero, Victor, et al. "Qualitative and quantitative analysis of crystallographic defects present in 2D colloidal sphere arrays." Langmuir 28.1 (2011): 161-167.
Chandramohan, A., Sibirev, N. V., Dubrovskii, V. G., Petty, M. C., Gallant, A. J., & Zeze, D. A. (2017). Model for large-area monolayer coverage of polystyrene nanospheres by spin coating. Scientific Reports, 7(1).
Chen, Liang-Yi, et al. "High performance InGaN/GaN nanorod light emitting diode arrays fabricated by nanosphere lithography and chemical mechanical polishing processes." Optics express 18.8 (2010): 7664-7669.
Colson, P., Henrist, C., & Cloots, R. (2013). Nanosphere Lithography: A Powerful Method for the Controlled Manufacturing of Nanomaterials. Journal of Nanomaterials, 2013, 1-19.
Deckman, H & H. Dunsmuir, J. (1982). Natural Lithography. Applied Physics Letters. 41. 377-379. 10.1063/1.93501.
Ershov, Dmitry, et al. "Capillarity-induced ordering of spherical colloids on an interface with anisotropic curvature." Proceedings of the National Academy of Sciences 110.23 (2013): 9220-9224.
Ho, Chi-Chih, et al., "Fabrication of Monolayer of Polymer/ Nanospheres Hybrid at a Water-Air Interface." ACS Applied Materials & Interfaces. (2011).
Gao, Min, et al. "Palladium-decorated silicon nanomesh fabricated by nanosphere lithography for high performance, room temperature hydrogen sensing." Small 14.10 (2018).
García Núñez, Carlos, et al. "Large-area self-assembly of silica microspheres/nanospheres by temperature-assisted dip-coating." ACS applied materials & interfaces 10.3 (2018): 3058-3068.
Gilbert, Marianne. "Relation of Structure to Chemical Properties." Brydson's Plastics Materials. Butterworth-Heinemann, 2017. 75-102.
Grandidier, Jonathan, et al. "Light absorption enhancement in thin-film solar cells using whispering gallery modes in dielectric nanospheres." Advanced materials 23.10 (2011): 1272-1276.
Gray, Andrew T., et al. "Structural characterisation of polycrystalline colloidal monolayers in the presence of aspherical impurities." Journal of Physics: Condensed Matter 27.19 (2015): 194108.

Grzybowski, Bartosz A., Howard A. Stone, and George M. Whitesides. "Dynamic self-assembly of magnetized, millimetre-sized objects rotating at a liquid-air interface." Nature 405.6790 (2000): 1033-1036.
Haynes, Christy L., and Richard P. Van Duyne. "Nanosphere lithography: a versatile nanofabrication tool for studies of size-dependent nanoparticle optics." (2001): 5599-5611.
He, Yang, et al. "Fabrication of large-area, close-packed, monolayer colloidal crystals via a hybrid method of spin coating and peeling-draining." Thin Solid Films 639 (2017): 98-106.
Ho, Yu-Hsuan, et al. "Transparent and conductive metallic electrodes fabricated by using nanosphere lithography." Organic Electronics 12.6 (2011): 961-965.
Iler, R.K (1966). Multilayers of colloidal particles. J Colloid Interface Sci. Journal of Colloid and Interface Science. 21. 569-594. 10.1016/0095-8522(66)90018-3.
Ji, Li, et al. "Integrated one diode-one resistor architecture in nanopillar SiO x resistive switching memory by nanosphere lithography." Nano letters 14.2 (2013): 813-818.
Koh, Yaw Koon, and Chee Cheong Wong. "In situ monitoring of structural changes during colloidal self-assembly." Langmuir 22.3 (2006): 897-900.
Li, Xue, and Gilchrist, James F. "Large-Area Nanoparticle Films by Continuous Automated Langmuir-Blodgett Assembly and Deposition." Langmuir. (2016).
Lotito, Valeria, and Tomaso Zambelli. "Self-assembly of single-sized and binary colloidal particles at air/water interface by surface confinement and water discharge." Langmuir 32.37 (2016): 9582-9590.
Lu, Zhicheng, and Ming Zhou. "Fabrication of large scale two-dimensional colloidal crystal of polystyrene particles by an interfacial self-ordering process." Journal of colloid and interface science 361.2 (2011): 429-435.
Madaria, Anuj R., et al. "Toward optimized light utilization in nanowire arrays using scalable nanosphere lithography and selected area growth." Nano letters 12.6 (2012): 2839-2845.
Maestro, Armando, et al. "Effect of the spreading solvent on the three-phase contact angle of microparticles attached at fluid interfaces." Physical Chemistry Chemical Physics 12.42 (2010): 14115-14120.
Meng, Xiaohui, and Dong Qiu. "Gas-flow-induced reorientation to centimeter-sized two-dimensional colloidal single crystal of polystyrene particle." Langmuir 30.11 (2014): 3019-3023.
Moitra, Parikshit, et al. "Large-scale all-dielectric metamaterial perfect reflectors." Acs Photonics 2.6 (2015): 692-698.
Lin, Yu-Ying, et al. "Monolayer Uniformity of the Nanosphere Mask: Two-dimensional ordered gold nanoparticle arrays with nanosphere lithography." IEEE Journals & Magazine. (2019).
Moon, Geon Dae, et al. "Assembled monolayers of hydrophilic particles on water surfaces." ACS nano 5.11 (2011): 8600-8612.
Moore, Lee J., et al. "Direct observation of grain rotation-induced grain coalescence in two-dimensional colloidal crystals." Nano letters 10.10 (2010): 4266-4272.
Purwidyantri, Agnes, et al. "Spin-coated Au-nanohole arrays engineered by nanosphere lithography for a *Staphylococcus aureus* 16S rRNA electrochemical sensor." Biosensors and Bioelectronics 77 (2016): 1086-1094.
Rengarajan, Rajesh, et al. "Effect of disorder on the optical properties of colloidal crystals." Physical Review E 71.1 (2005): 016615.
Retsch, M., Zhou, Z., Rivera, S., Kappl, M., Zhao, X. S., Jonas, U., & Li, Q. (2009). Fabrication of Large-Area, Transferable Colloidal Monolayers Utilizing Self-Assembly at the Air/Water Interface. Macromolecular Chemistry and Physics, 210(3-4), 230-241.
Rivera, José A., et al. "Fractal modes and multi-beam generation from hybrid microlaser resonators." Nature communications 9.1 (2018): 2594.
Shinotsuka, Kei, et al. "Crystal Perfection of Particle Monolayer at the Air-Water Interface." Langmuir 31.42 (2015): 11452-11457.
Sun, Jie, et al. "Fabrication of centimeter-sized single-domain two-dimensional colloidal crystals in a wedge-shaped cell under capillary forces." Langmuir 26.11 (2010): 7859-7864.

(56) References Cited

OTHER PUBLICATIONS

Wang, Dapeng, et al. "Bioinspired ribbed hair arrays with robust superhydrophobicity fabricated by micro/nanosphere lithography and plasma etching." RSC Advances 5.117 (2015): 96404-96411.

Wei, Q. H., and X. L. Wu. "Grain boundary dynamics under mechanical annealing in two-dimensional colloids." Physical Review E 70.2 (2004): 020401.

Ye, Ran, et al. "Gravity-assisted convective assembly of centimeter-sized uniform two-dimensional colloidal crystals." Langmuir 29.6 (2013): 1796-1801.

Yu, Jie, et al. "Preparation of high-quality colloidal mask for nanosphere lithography by a combination of air/water interface self-assembly and solvent vapor annealing." Langmuir 28.34 (2012): 12681-12689.

Zhang, Chenlong, Sandra Cvetanovic, and Joshua M. Pearce. "Fabricating ordered 2-D nano-structured arrays using nanosphere lithography." MethodsX 4 (2017): 229-242.

Zhang, Jian-Tao, et al. "Fabrication of large-area two-dimensional colloidal crystals." Angewandte Chemie International Edition 51.25 (2012): 6117-6120.

Zhu, Xiaolong, et al. "Plasmon-phonon coupling in large-area graphene dot and antidot arrays fabricated by nanosphere lithography." Nano letters 14.5 (2014): 2907-2913.

Zrimsek, Alyssa B., Anne-Isabelle Henry, and Richard P. Van Duyne. "Single molecule surface-enhanced Raman spectroscopy without nanogaps." The Journal of Physical Chemistry Letters 4.19 (2013): 3206-3210.

\* cited by examiner

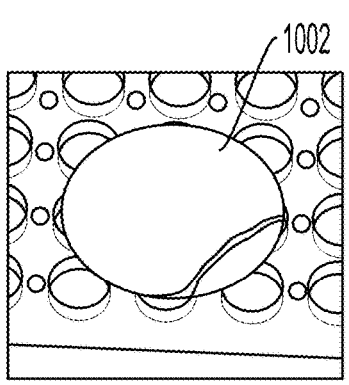
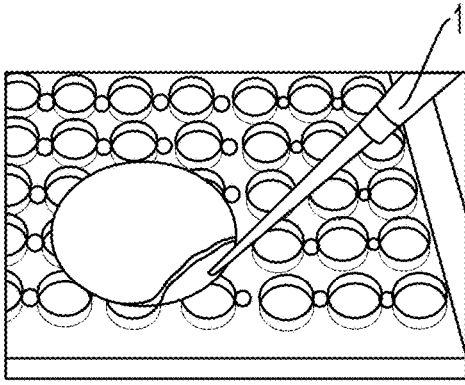
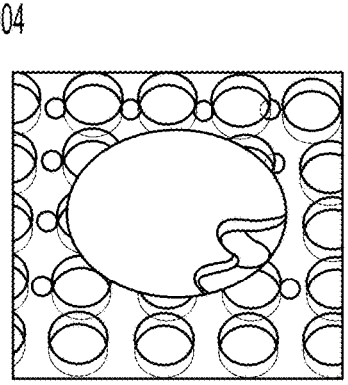
FIG. 10A  FIG. 10B  FIG. 10C
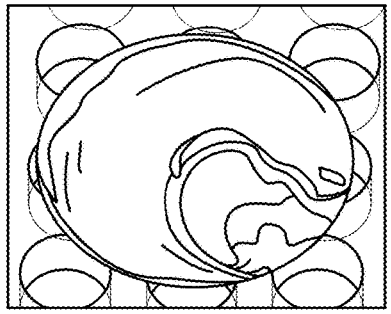
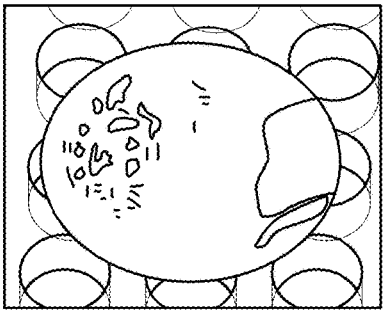
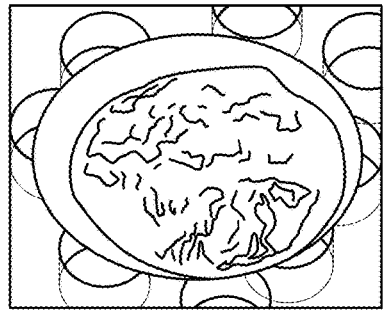
FIG. 10D  FIG. 10E  FIG. 10F
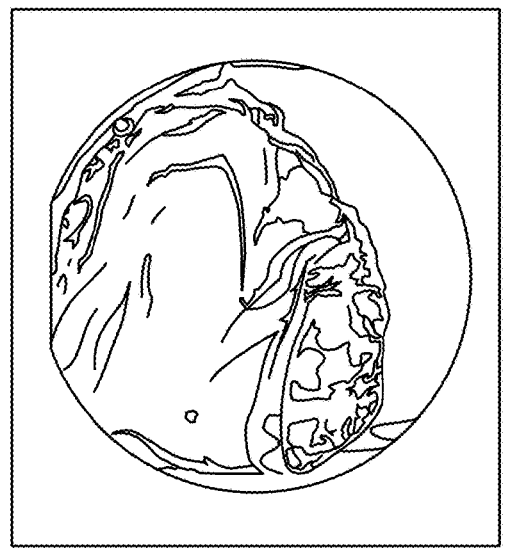
FIG. 10G  FIG. 10H

METHODS AND SYSTEMS FOR LARGE AREA AND LOW DEFECT MONOLAYER ORDERING OF MICROSPHERES AND NANOSPHERES

CROSS-REFERENCE TO RELATED APPLICATIONS

The present application is a non-provisional patent application claiming priority to U.S. Provisional Patent Application No. 63/129,434, filed Dec. 22, 2020, the contents of which are hereby incorporated by reference.

FIELD OF THE DISCLOSURE

The present disclosure relates to large area and low defect monolayer ordering of microspheres and nanospheres. More particularly, embodiments of the present disclosure describe assembly of colloidal crystals.

BACKGROUND

Nanosphere lithography (NSL) is a low-cost, materials general, inherently parallel, and high throughput bottom-up fabrication technique. The characteristic feature of NSL is the self-assembled colloidal nanosphere mask, which enables a more cost-effective option for large area patterning compared to serial fabrication with electron beam lithography. The resultant feature size is linked to the diameter of a single constituent nanosphere and can be varied from sub-50 nm to 10 μm. Therefore, NSL offers a flexible lithography tool for fabricating a number of devices like surface-enhanced Raman sensors, metasurfaces, photovoltaics, resistive switching memory, transparent electrodes, light-emitting diode arrays, chemical sensors, superhydrophobic surfaces and lasers.

The colloidal sphere mask can be fabricated through dip coating, spin coating, convective assembly, Langmuir-Blodgett assembly or air-water interfacial assembly. Air-water interfacial assembly holds great promise towards achieving wafer-scale low-defect single-crystal masks. The assembly method benefits from the inherent ability of the colloidal spheres to spontaneously self-assemble into a loose-packed monolayer at the air-water interface. The self-assembly process is driven by attractive capillary forces due to the air-water interface depression by the spheres and resisted by the steric repulsion between the spheres. Close hexagonal packing is achieved with the addition of surfactants, which lower the intersphere attraction forces and allow the spheres to rearrange themselves. The resultant colloidal masks have demonstrated short-range ordering, and large centimeter-sized single crystals using external energy sources.

SUMMARY

Single-layer, periodic repeating geometric patterns of spheres with micrometer and nanometer dimensions can exhibit very interesting properties, such as the ability to guide light across a surface or manipulate electromagnetic radiation. A common example of this structure, the gemstone opal, is composed of micrometer dimension spheres of silica (glass) arranged in a repeating geometric pattern; this pattern interacts with light to create sparkling patterns of color which are considered by many to be beautiful. In Langmuir-Blodgett films, organic materials are assembled as an ordered monolayer on the surface of a liquid. The Langmuir-Blodgett films are created utilizing a Langmuir-Blodgett trough.

The Langmuir-Blodgett trough utilizes on-water monolayer assembly using the walls of a rectangular or circular container of liquid to confine the material to be assembled; material is added to the surface of the water until the water surface is covered completely, then a movable barrier is utilized to compress the material to a specified surface pressure. After compression, the monolayer film is transferred to a solid substrate by immersing the substrate into the liquid, then withdrawing the substrate at a normal or near-normal angle to the liquid surface. The Langmuir-Blodgett method and apparatus rely on the compression of nanospheres and micrometer scale monolayers to a specified surface pressure to indicate maximum packing density of the material, and utilizes only a liquid and the material to be deposited for the assembly process.

An example method of the present disclosure includes dispensing a liquid onto a first portion of a surface of a substrate. The method further includes dispensing a solution comprising colloidal spheres onto a second portion of the surface of the substrate. The method additionally includes agitating the colloidal spheres to disperse the colloidal spheres along the first portion and the second portion of the surface of the substrate. And the method includes directing air flow above the colloidal spheres inducing rotation of the colloidal spheres.

In another example, a method includes positioning a retaining ring on a surface of a liquid above a substrate below the surface of the liquid and dispensing a solution comprising colloidal spheres onto the surface of the liquid within a surface area of the retaining ring. The method further includes agitating the surface of the liquid and the colloidal spheres to disperse the colloidal spheres along the surface area of the retaining ring. The method additionally includes removing the liquid to transfer the retaining ring and the colloidal spheres onto a surface of the substrate.

BRIEF DESCRIPTION OF THE FIGURES

The above, as well as additional, features will be better understood through the following illustrative and non-limiting detailed description of example embodiments, with reference to the appended drawings.

FIGS. 10A-10H illustrate process steps for the On-Wafer Assembly process flow, according to an example embodiment.

Figure 1:
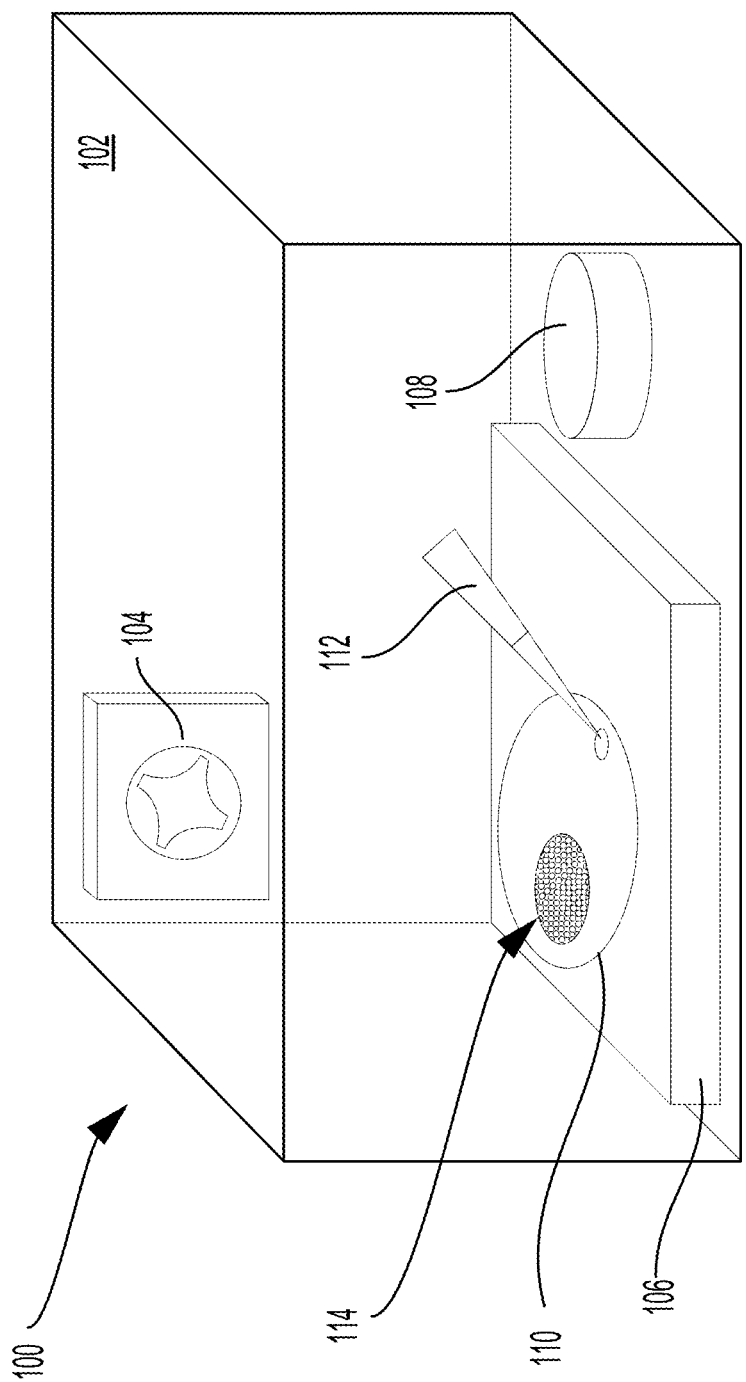
FIG. 1 illustrates an example embodiment of a purpose-built assembly step.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Nanosphere lithography (NSL) is an inexpensive and powerful lithography technique that allows large-area parallel fabrication of sub-diffraction limit features. Widespread application of NSL is hindered by an incomplete understanding of the NSL mask self-assembly process. As a result, published mask fabrication recipes are hard to replicate with variable grain sizes and defect densities.

Embodiments of the present disclosure include a dynamic self-assembly process of approximately 1 μm polystyrene colloidal spheres. It is observed that addition of propylene glycol to the colloidal solution, and, use of low-velocity air and low-frequency acoustic external energy sources provides reliable fabrication of inch-scale quasi single crystals. The short-range and long-range defect density characterization identifies sphere diameter variation and evaporation induced line defects as the primary causes of defect generation. Solvent treatment of the colloidal crystal reduces mean defect density by a factor of 4.5× with a complete elimination of evaporation induced line defects.

However, creating a single layer of ordered spheres across a large area is not easily achieved. Since the first publication describing a method for "Natural Ordering" of spheres in 1980, the largest reported area of self-assembled spheres in a low-defect hexagonal close-packed geometric arrangement is no larger than 1 cm in diameter. Larger areas have been reported, but the periodicity of the arrangement is poor, consisting of small "grains" on the order of square millimeter (often less) areas which are randomly oriented to each other, with large defect regions between the individual grains. In addition, the most common method for single layer ordering of spheres is the Langmuir-Blodgett technique, which is dependent on operator skill and specialized dedicated equipment. However, Langmuir-Blodgett films were initially used for deposition of organic monolayers onto a solid substrate and only later adapted for the assembly of micro- and nanospheres. Other techniques, such as convective assembly, are not suitable for large scale production due to the very long time scales (days to weeks) required for the ordering process. Because of these limitations described above, the application of ordered spheres has not progressed beyond use in research environments.

The ability to generate large ordered monolayer films in short time periods would make practical the ability to improve existing manufacturing methods or the introduction of new revolutionary products, such as large area micro-lens arrays for imaging systems, ultra-high reflectivity meta-materials, photonic crystals, electromagnetic cloaking structures for stealth applications, nanowires, addressable field-emission structures, and large ion thrust propulsion systems, to name a few.

Embodiments of the present disclosure include methods and systems that overcome the limitations of producing ordered sphere monolayers. Embodiments include multiple methods for the production of highly ordered, low defect, very large area hexagonally close-packed monolayers of spheres. In embodiments, the methods have demonstrated the ability to create single uninterrupted grains exceeding 6 cm in diameter of repeatable quality in less than an hour. The dimensions achievable have been limited only by the size of the substrate and equipment used during assembly; as system size has increased, the resulting grain dimension has scaled linearly. The defect density of the assembled grain is dependent upon the method utilized, ranging from 'good enough' for many applications when using the basic method, to defect densities that are determined only by the quality of the spheres used for assembly—i.e. individual defects can be attributed traced to a sphere that is misshaped or mis-sized.

The characterization of long-range ordering in large single crystals is lacking. The single crystal formation process under the presence of internal stresses due to polydisperse spheres and, external stresses due to the energy sources and the evaporation of water is not well understood. Additionally, the role of the surface properties of the colloidal spheres and the air-water interface in achieving good long-range ordering needs to be evaluated.

In certain embodiments, the methods utilize a confined water surface to define the plane where assembly occurs. Additional mechanisms and chemistries have been developed to control the surface tension, density, sticking coefficients, external energy input, internal forces, and air flow of the system. These factors have been isolated and have been determined to influence the quality, size, and reproducibility of the assembly process. The methods developed are low cost and utilize common and nontoxic materials and chemicals.

In additional to methodologies for producing large area assembled spheres, additional embodiments include complete stand-alone systems to control and automate the assembly process, remove the requirement for a skilled operator, improve the repeatability of the resulting assembled grain, and allow for production in most environments, including large-scale and high volume manufacturing.

Now referring to FIG. 1, an example embodiment of a purpose-built assembly setup 100 to form a colloidal crystal 114. More particularly, FIG. 1 shows a purpose-built setup 100 providing control of air velocity and flow pattern, and, acoustic energy input to optimize the colloidal sphere assembly. In examples, a purpose-built setup 100 includes an acrylic enclosure 102 including an inlet fan 104 and an acrylic bench 106. Additionally, in some examples, the purpose-built setup 100 includes an acoustic actuator 108.

In an example, a silicon wafer 110, for example, a 100 mm silicon wafer, is placed in the front-open acrylic enclosure 102 fitted with a variable speed inlet fan 104 and the acoustic actuator 108. The silicon wafer 110 is completely coated with a deionized water (DI) layer with the exception of a small edge area to serve as the colloidal solution dispense site. The surface water contact angle for the silicon wafer can be increased to about 40° (ranging from 35°-45° using hydrocarbon deposition for approximately 120 hours in an ISO 1000 cleanroom environment. This allows higher volumes of DI to be loaded, which increases the air-water interface curvature and efficiently couples external energy on to the interface.

The colloidal solution, hereafter referred to as DIPGIP, comprises of 5:15:15:10:1 of DI:PG:isopropanol (IPA): 10% wt. 1 μm polystyrene spheres (PSL):methanol. DIPGIP is pipetted in small volume iterations at the edge dispense site by way of a pipette 112. The colloidal spheres are slowly picked up by the water contact front and added to the curved air-water interface of the DI layer.

Now referring to FIGS. 2A-2D, steps of an example purpose-built assembly process. More particularly, FIGS. 2A-2D illustrate the formation process for an inch-sized quasi single crystal.

Figure 2A:
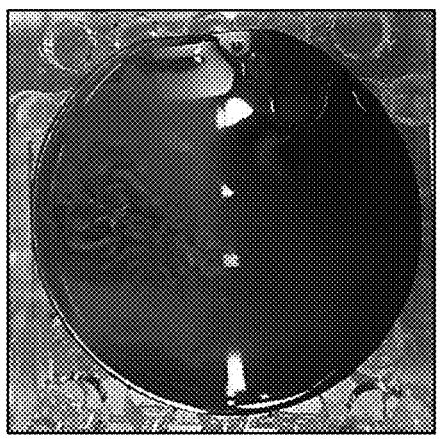
FIGS. 2A-2D illustrate steps of an example purpose-built assembly process.

At the early stages of the solution injection process, as shown in FIG. 2A, the colloidal spheres form loose chains on the air-water interface. These loose chains are transported away from the dispensing site by the Marangoni forces, rotated away from the left edge by the air currents, and aggregate in the center of the wafer.

Figure 2B:
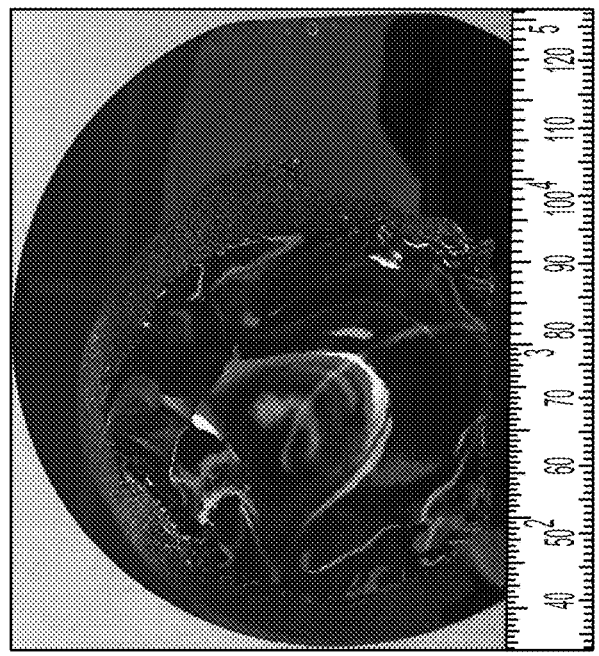
Figure 2C:
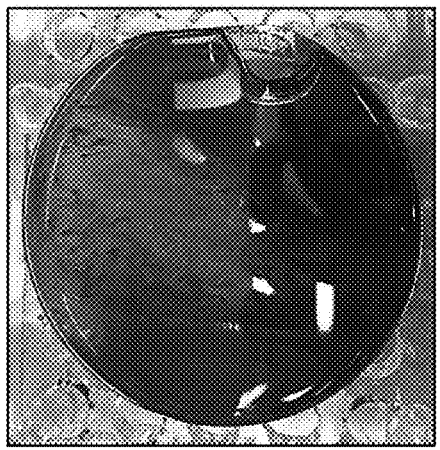

As the colloidal sphere chain concentration increases, the loose chains compact to form a polycrystalline grain core, as shown in FIG. 2B, due to the increased capillary force attraction at the curved air-water interface and the surface adsorbed PG layer on the colloidal spheres. The PG coating layer, similar to traditional surfactants, reduces the local surface tension and improves sphere mobility. The degree of hexagonal symmetry of the assembling film is visually identifiable due to the grating-like structure created by the spheres, with grain orientation defining the observed color. Grain boundaries cause sharp changes in the diffraction pattern, thereby providing a visual characterization of the long-range ordering. It is observed that upon formation of the central polycrystalline core, dispensing additional colloidal solution contributes to an increase in the total area of the core, where arriving spheres either contribute to the main core or produce smaller grains at the perimeter. Simultaneously, the grains in the central core coalesce, through grain rotation induced grain coalescence (GRIGC) resulting from low-frequency acoustic vibrations supplied to the system. GRIGC involves rotation of the constituent grains to eliminate grain boundaries, where the boundary elimination time is inversely proportional to the grain size. This process of grain boundary reduction is accelerated by imparting a circular rotation to the polycrystalline core using directed air currents. FIG. 2C shows the polycrystalline grain core after the end of the recipe addition process, where a number of large quasi single crystals are observed.

Figure 2D:

The optimization process continues until a single inch-sized quasi single crystal is formed. At this point, the external energy sources are switched off. The crystal is extracted by breaking the DI layer surface at the wafer edge with an absorbent cleanroom wipe (e.g., Texwipe Techni-Cloth). This leads to draining of the bulk DI layer, and, the compaction of the quasi-single crystal due to Marangoni forces. The resultant inch-sized quasi single crystal is shown in FIG. 2D. Additionally, a significant number of the spheres introduced into the bulk volume of the DI layer are removed. These spheres are known to cause triplet defects in two-dimensional colloidal crystals. By leveraging the physical boundaries of the target substrate, the properties of the selected chemistries, and, the solid-liquid/liquid-liquid/liquid-gas interfaces, this technique provides the same localization effects that up to this point in time required the use of a polymer ring. As a result, the technique reduces process complexity, increases cleanliness of the resulting structure, and eliminates the defects introduced by transfer processes.

The surface properties of the colloidal spheres play a vital role in the formation of large-area single crystals. It has been shown that the sphere surface modified with adsorbed alcohols or surfactants mediates the intersphere attraction forces, thereby driving the formation of a close-packed colloidal polycrystal. Single crystal ordering can be subsequently enforced in the polycrystal with the use of external energy sources. The requirement for complicated energy sources can, however, be alleviated by optimizing the colloidal solution. Therefore, in addition to the commonly used alcohols like IPA and methanol, DIPGIP also contains PG. The choice for PG is made due to an equivalent density to polystyrene (1.033 $g/cm^3$), a reduced surface tension as compared to water (45.6 dynes/cm at 25° C.) and a low vapor pressure (20 Pa at 20° C.).

Figure 3A:
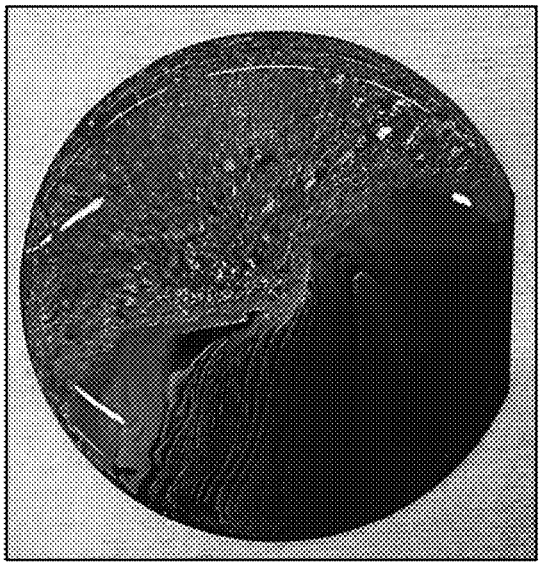
FIGS. 3A-3D illustrate steps of an example self-assembly process.
Figure 3B:
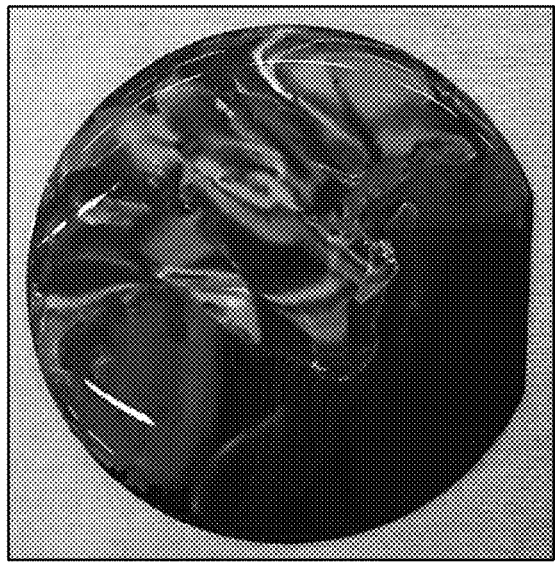
Figure 3C:
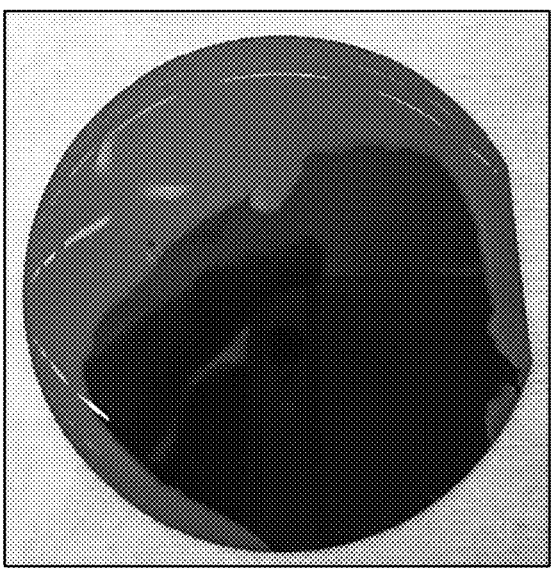
Figure 3D:
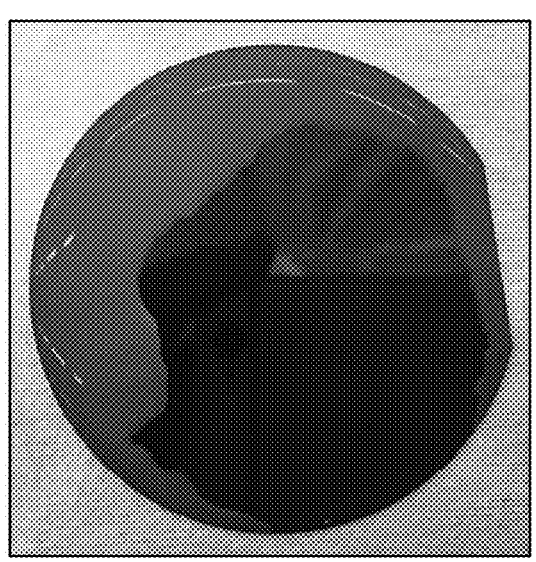

FIG. 3A-3D show an embodiment of self-assembled colloidal crystals on air-water interface for DIPGIP solution, as shown in FIG. 3A, DIPGIP solution with shaking, as shown in FIG. 3B, 4:1 IPA:PSL solution, as shown in FIG. 3C, and 4:1 IPA:PSL solution with shaking, as shown in FIG. 3D. In embodiments shown in FIGS. 3A-3D, the silicon wafers are 55 mm in diameter.

FIGS. 3A and 3C show the static self-assembled colloidal crystals for the DIPGIP solution and a non-PG solution containing 4:1 IPA:PSL respectively. The interfacial assembly is performed without the presence of external air currents and acoustic vibrations. It is observed from FIG. 3A that the inclusion of PG results in millimeter-sized single crystals upon loading. The surface adsorbed PG layer on the colloidal spheres reduces the local surface tension, which improves sphere mobility and allows sphere grains to slide multiple lattice sites in order to prevent grain boundary formation.

These polycrystals can be optimized into centimeter-sized quasi single crystals by a simple shaking motion, as shown in FIG. 3B. The localization effect inherent in the assembly process preserves the dynamic structure of the large-area crystal even after the shaking motion is ceased. Meanwhile, the colloidal crystals from the 4:1 IPA:PSL solution do not optimize into large single crystals under the same dynamic conditions, as shown in FIG. 3D.

The surface adsorbed PG layer also enables efficient loading of the colloidal spheres on to the curved air-water interface. For example, a colloidal solution droplet upon dispense at the edge of the silicon wafer. Following the dispense, the droplet expands on the hydrophilic silicon surface. This leads to the evaporation of the alcohol in the droplet and retraction of the waterfront in close proximity to the alcohol vapor. The remaining mixture of DI, PG, and PSL, agglomerates into smaller droplets due to surface tension. The mixture droplets are surrounded by fields of monolayer sphere grains precipitated out during the agglomeration process.

Figure 4A:
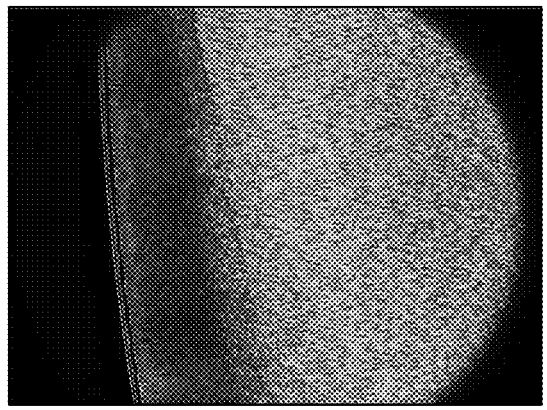
FIGS. 4A-4C illustrate example colloidal solution regimes.
Figure 4B:
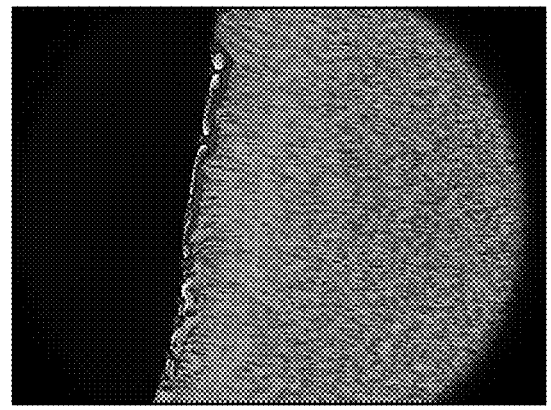
Figure 4C:
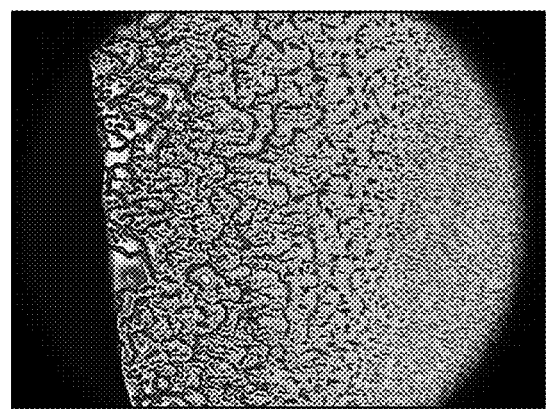

Once the water front starts advancing, three different loading regimes for the colloidal spheres are observed. These regimes are depicted in FIGS. 4A-4C. Regime 1, as shown in FIG. 4A is initiated when the advancing water front makes contact with a mixture droplet. Initially, the droplet influx volume dwarfs the water front loading rate. As a result, flow vortexes are generated which leads to an accumulation of sphere multilayers at the waterfront. The resultant non-optimal loading introduces a large number of spheres to the bulk volume of water.

Regime 1 quickly transitions into Regime 2, as shown in FIG. 4B, when an equilibrium is established between the droplet influx volume and the waterfront loading rate. The turbulent influx flow in the previous regime transitions into a laminar influx flow and generates monolayer sphere grains at the pinning point of the waterfront. The preferential formation of monolayer sphere grains is attributed to the sphere PG coating as this phenomenon is not observed for non-PG solutions. The resultant loading is preferential to the air-water interface and introduces significantly fewer spheres into the bulk volume of water.

As the puddle influx slows down further, the loading process transitions to Regime 3, as shown in FIG. 4C, which is marked by the formation of monolayer sphere grains away from the waterfront. These grains agglomerate into larger anisotropic chains upon departure of their accompanying solvent. The waterfront is observed to unzip the long chains in a sphere by sphere stripping process with the majority of the spheres transferring to the air-water interface. The loading process continues in Regime 3 until the next puddle is encountered. It is important to note that the loading process can be optimized to load primarily in Regime 2 with the use of a syringe pump. The loading regimes for the non-PG solutions can contain 4:1 IPA:PSL. It is observed that the absence of the mediating effect of PG leads to frequent formation of sphere multilayers at the waterfront. The resultant loading introduces a large number of spheres into the bulk volume of water.

Figure 5:
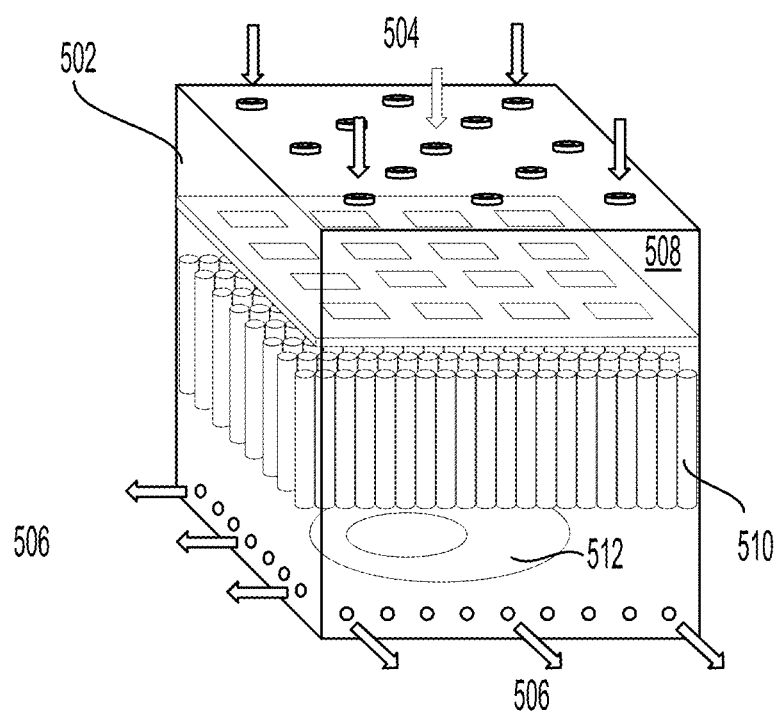
FIG. 5 illustrates an example embodiment of the solvent annealing chamber.

Solvent annealing treatment of colloidal crystals leads to a significant reduction in the line defect density. In this technique, an aerosolized solvent gas is applied to the colloidal crystal on the air-water interface prior to extraction. The polymer chains on the spheres absorb the solvent molecules, migrate over to the contact points with the neighboring spheres and fuse with other polymer chains to minimize their surface free energy. This results in the creation of a crack-resistant two-dimensional colloidal crystal film. The aerosolized solvent vapor is produced by passing a carrier nitrogen gas through a solvent cement (e.g., Weld-On #4). The resultant vapor contains trichloroethylene, which readily dissolves polystyrene. FIG. 5 shows the solvent annealing chamber that functions as an add-on module for the assembly setup shown in FIG. 1.

More particularly, an example embodiment of the solvent annealing setup 500, as shown in FIG. 5, includes an acrylic enclosure 502, gas inlets 504, and gas outlets 506. The acrylic enclosure 502 includes a screen 508 and screen mesh 510 (e.g., hexagonal pipe mesh) above the sample 512 (e.g., a large area colloidal crystal).

The chamber is designed as a wind tunnel settling chamber that achieves a low-speed highly uniform laminar flow. The aerosolized vapor enters the chamber through the gas inlets 504 (e.g., a showerhead) and immediately expands in the volume above the screen mesh 510. Subsequently, the vapor starts moving down due to gravity effects. The screen mesh 510 eliminates the longitudinal flow components and the honeycomb flow straightener laminarizes the vertical flow components. After application on the large area colloidal crystal 512, the solvent vapor exhausts out at the base of the chamber 502 at the gas outlets 506.

Figure 6A:
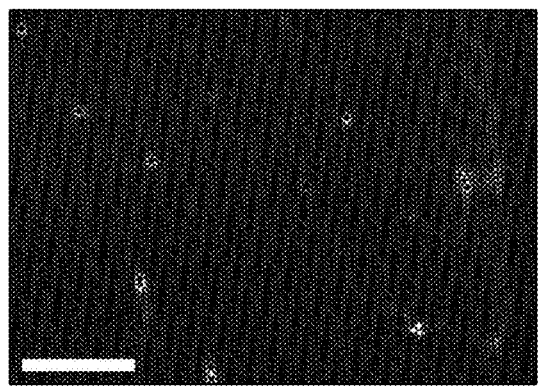
FIGS. 6A-6D illustrates images of colloidal crystals throughout the treatment process, according to an example embodiment.
Figure 6B:
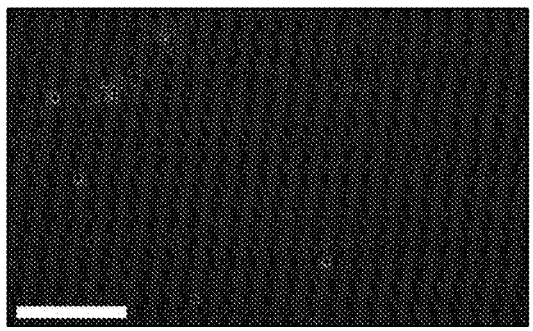
Figure 6C:
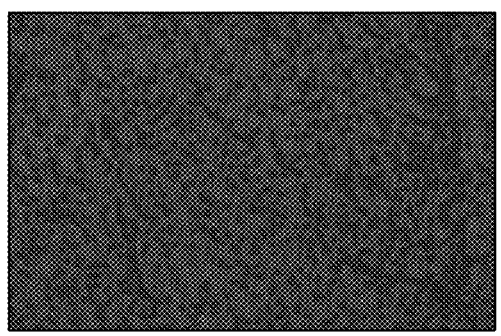
Figure 6D:
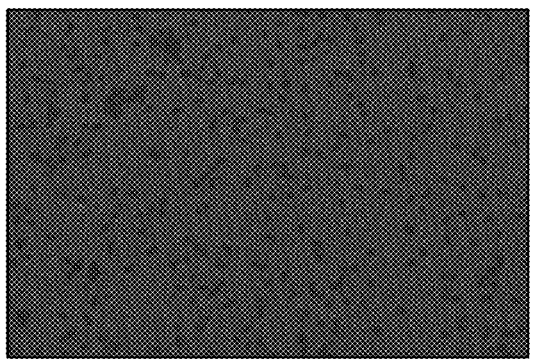

The inner structure of the inch-scale quasi single crystal is probed using high-vacuum high-energy scanning electron microscopy (SEM). Large-area SEM scans are captured from randomly distributed points in the crystal. FIG. 6A shows an SEM image of an embodiment of the untreated colloidal crystal (Scale: 25 μm) and FIG. 6B shows an SEM image of a colloidal crystal with 30 minutes of solvent treatment. FIG. 6C shows a processed image of FIG. 6A. FIG. 6D shows a processed image of FIG. 6B.

Figure 6E:
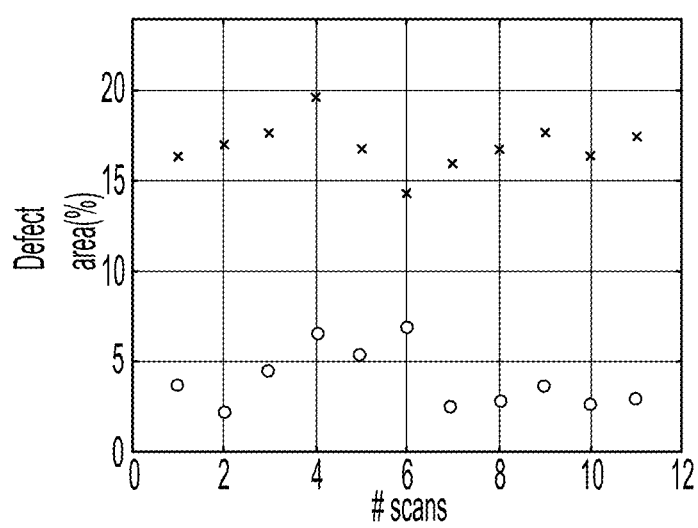
FIG. 6E illustrates a graph of defect areas for treated and untreated colloidal crystals, according to an example embodiment.

FIG. 6E shows a graph of defect area for untreated ("X" markers) and solvent treated ("O" markers) colloidal crystals. Each data point represents one large area SEM scan. It is observed that imaging the colloidal crystal leads to SEM edge effects with the defect sites appearing brighter than the neighboring perfect crystal. This contrast is attributed to the higher number of secondary electrons that can escape from the defect sites. As a result, SEM imaging presents a highly sensitive tool for qualitative assessment of the crystal defect density. The colloidal crystal possesses point defects, such as miscoordinated spheres, monovacancies, divacancies, multilayer triplet defects, and dendritic line defects.

Point defects can include miscoordinated spheres and vacancies are caused by the colloidal sphere size and shape polydispersity. Triplet defects are generated by submerged spheres pushing up on the monolayer crystal during the drying process. The displaced spheres reconstruct into a triplet formation. The dendritic line defects are caused by the ultra-fast crystal lattice transformation due to the evaporation of water. Line defects originate from the point defect sites.

As noted above, FIG. 6B show a large area SEM scan of a colloidal crystal with 30 minutes of solvent treatment. The solvent annealing process largely eliminates dendritic line defects. However, the point source defects of miscoordinated spheres, vacancies and triplets are still present. The defect density is quantified using a MATLAB algorithm derived from the pair correlation function approach. The large area SEM scans are processed using circular Hough transform and Delaunay triangulation to create a triangular mesh connecting the sphere centers. The distance between neighboring spheres is measured against a range of 105 nm around the mean sphere diameter. If the distance falls outside the range, then a defect is detected.

FIG. 6C and FIG. 6D show the defective areas overlaid over the original images of FIG. 6A and FIG. 6B respectively. FIG. 6E plots the defect area percentages of large area SEM scans for both untreated and solvent treated colloidal crystals. It is observed that the solvent annealing treatment leads to ~4.5× improvement of the mean defect area percentage. Further, very low disorder (<1%) colloidal crystals require a strategy for reduction of the sphere diameter variation.

Figure 7:
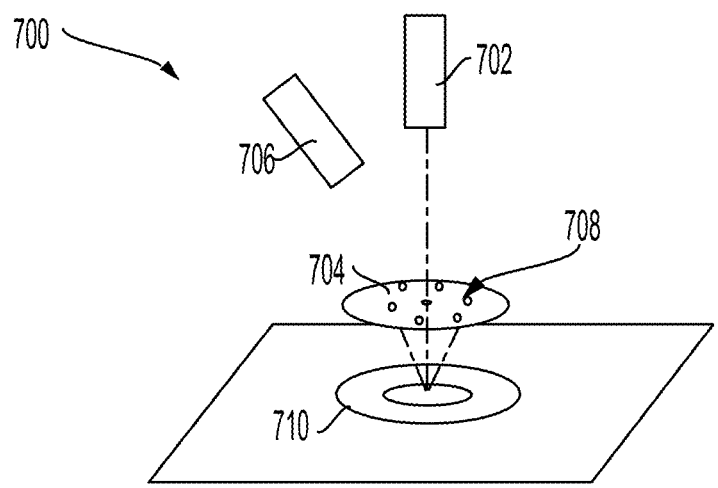
FIG. 7 illustrates a laser diffraction setup for large-area twist measurement, according to an example embodiment.

Pattern formation is a fundamental feature of dynamic self-assemblies. The circular symmetric external energy input and a lack of global boundary condition leads to a circular symmetric twist in the large quasi-single crystal. FIG. 7 shows the laser diffraction setup 700 for large-area twist measurement. The laser diffraction setup 700 includes a laser 702, a screen 704, and a camera 706. The screen 704 is above the sample 710. In some examples, the screen 704 includes a hexagonal diffraction pattern 708.

Figure 8:
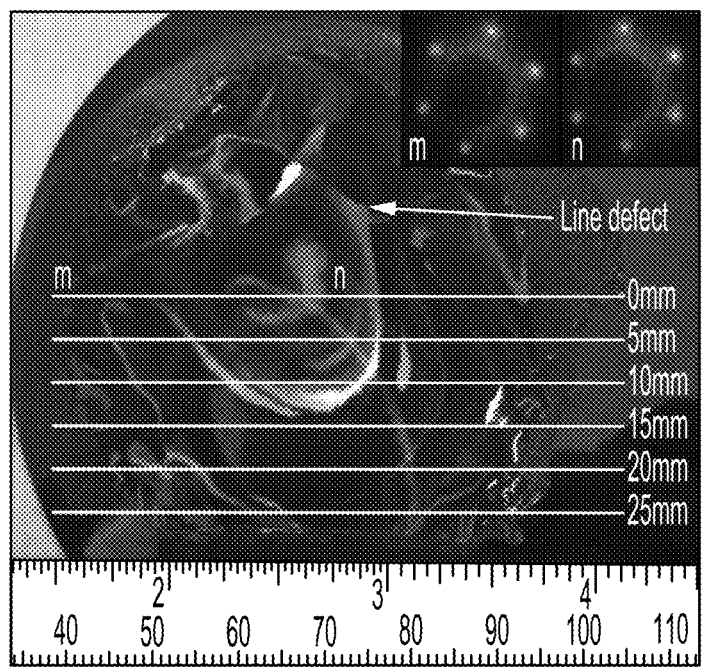
FIG. 8 illustrates an image of diffraction spots on a crystal.

In examples, the inch-scale quasi single crystal from FIG. 2D, shown in FIG. 7 as element 710, is exposed to a laser 702 (e.g., a HeNe laser) and the resultant diffraction pattern is recorded on a screen 704. As the laser spot is moved along cross-section lines over the colloidal crystal (six lines are shown in FIG. 8), the rotation of the diffraction pattern gives the change in the relative crystal orientation. The high level of hexagonal crystal symmetry is demonstrated by the crisp diffraction spots given in the inset of FIG. 8. Additionally, a qualitative assessment of the circular symmetric twist can be made by observing the contours of the reflection patterns in the optical image.

Figure 9B:
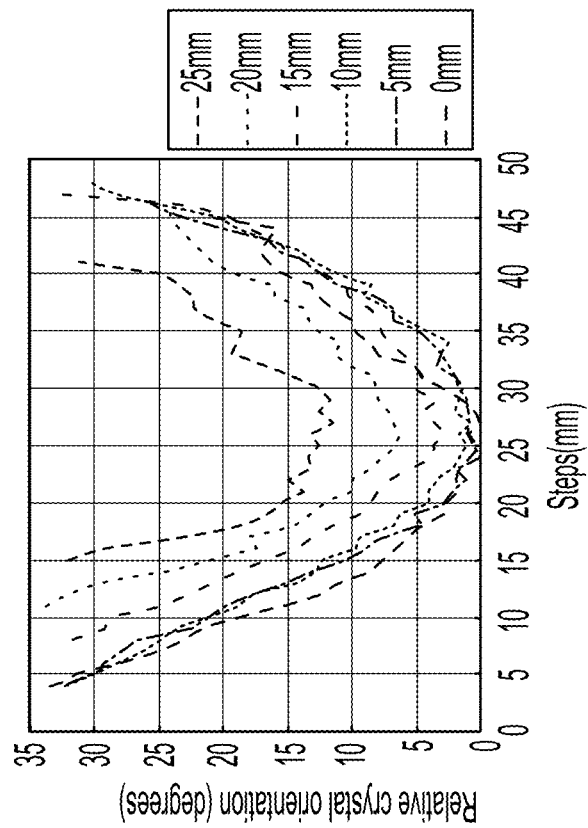
FIGS. 9A-9B maps relative crystal orientation for various diffraction measurement paths.
Figure 9A:
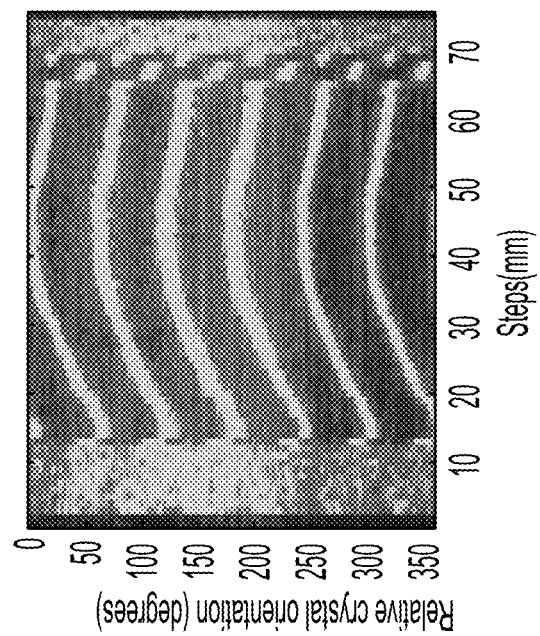

FIG. 9A maps the relative crystal orientation as the laser spot moves along the y=0 mm path. The sharp change in the orientation towards the end of the path indicates a line defect. This effect can be qualitatively observed with the large line defect marked in FIG. 8. FIG. 9B maps the relative crystal orientation for all of the measurement paths. The roughness in the curves is attributed to image processing errors. The circular symmetric crystal twist is indicated with the crystal edge having the maximum relative orientation of 34° with respect to the crystal center. In order to enforce a single crystal orientation, a hexagonal boundary confinement can be employed.

Embodiments of the present disclosure include a reliable recipe for fabrication of inch-scale quasi single colloidal crystals on a curved air-water interface. In an embodiment, the addition of PG to the colloidal solution is shown to effectively modulate the intersphere attraction forces. This results in the creation of centimeter-scale quasi single crystals just by shaking the substrate. Thereafter, regimented external energy inputs in the form of low-velocity air currents and low-frequency acoustic vibrations are shown to support grain coalescence. The long-range crystal defect density is probed using scanning electron microscopy, laser diffraction and image processing. It is deduced that the primary causes of crystal defects are the sphere diameter and shape polydispersity, and, the stresses due to the evaporation of water. Line defect generation due to the evaporation stresses can be eliminated using solvent annealing, which results in a 4.5× reduction in total defect density and total elimination of line defects. The presence of circular symmetric twist in the large quasi single crystal is attributed to the circular symmetry of the external energy sources and lack of a global boundary condition. In a broader context, this study lays the pathway for the realization of wafer-scale low-defect single crystal masks and wider application of nanosphere lithography.

Examples

A. Method for Production of Low Defect, Conformable, Surface Independent, Very Large Area Continuous Single-Domain Close-Packed Self-Assembled Micrometer- and Nanometer-Scale Diameter Spheres A method for producing high quality geometrically and spatially periodic close-packed ordered spheres on arbitrary surfaces of arbitrary x, y, and z dimensions, surface topology, and cross-sectional profile is disclosed. An embodiment of the technique is disclosed below. Additional extensions to the basic methodology are presented as separate methods, and are utilized for optimization of resulting ordered films based on user defined requirements and the intended use and/or purpose of resulting ordered films.

The core method for production comprises following materials and processes:

Colloidal Spheres to Be Utilized for Ordering: micro- and nanometer-scale monodisperse spheres which are available in a variety of material composition, diameters, uniformity of dimension and shape (coefficient of variance, Cv), and concentration in a colloidal solution. A common sphere specification (and for which the majority of development work has been performed, but which the disclosed method is not limited to) is presented as an example:
  Polystyrene latex spheres
  1 µm diameter
  Cv=1.5%
  10% w/v in deionized water (includes a trivial amount of surfactant for initial wetting of spheres)

Note that sphere diameter, material, concentration, and coefficient of variance influence the chemical constituents of the diluent and the resulting quality of assembled mono layer. Dilute Sphere Dispensing Solution: the colloidal sphere solution is diluted for dispensing using one or more of a combination of chemicals selected for specific properties such as density, surface tension, vapor pressure, and viscosity.

Common diluents include, but are not limited to:
  Solvents: Acetone, Isopropanol, Methanol, Ethanol
  Glycols: Ethylene Glycol, Propylene Glycol, Glycerol
  Deionized Water An example dispensing solution utilized for 1 µm polystyrene consists of the following mixture:
  1 part by volume commercially sourced 10% w/v 1 µm diameter polystyrene spheres colloidal suspension in deionized water
  1 part by volume ACS Reagent Grade methanol
  3 parts by volume ACS Reagent Grade propylene glycol Note that composition of the dispensing solution is dependent upon sphere diameter, dispensing technique, and acceptable defect density and defect type. Composition and ratios of the solution are determined by sphere material, dimension, and dispense method. All materials utilized are ACS Reagent grade or more stringent purity standards, including but not limited to Semiconductor/CMOS Grade and HPLC Grade. High purity materials must be utilized to prevent contamination to the surface which spheres will be deposited and to control reproducibility.

Preparation of Surface onto Which Ordered Spheres Are Deposited: cleaning and surface modification is dependent upon the specific ordering technique deployed and is discussed in detail for the specific methods which follow the main embodiment. Example surface preparation process utilizing a single crystal silicon substrate:
  Degreasing of substrate utilizing washes with acetone, isopropanol, deionized water, and/or other solvents to remove surface organic contaminants
  Hydrofluoric acid etch to remove native surface oxide
  Isopropanol rinse followed by nitrogen blow drying to slightly reduce contact angle of surface; resulting surface exhibits a contact angle less than original surface, but greater than a fully hydroxylated surface Mechanism for Dispensing Spheres: a device for dispensing controlled amounts (µL scale) of dispensing solution, such as a micro-syringe or pipette, is utilized to place the sphere dispensing solution controllably to begin the assembly process.

Dispensing onto Liquid Surface: self-assembly of spheres occurs on the surface of a laterally confined liquid, typically deionized water. Sphere dispensing solution is applied to the liquid surface with a syringe or pipette utilizing techniques which promote floating of spheres on the liquid surface and are dependent upon the assembly method employed. Based on physical arrangement of confined liquid surface and composition of dispensing solution, spheres begin assembling into a single floating mono layer mass. Additional spheres are added until desired dimension of domain is achieved; dimension of sphere domain must be less than dimension of confined liquid surface area to allow unrestrained mobility of domain while assembling (approximately ⅔ of the area of confined liquid surface).

Controlled Input of Energy to Promote Assembly: energy is supplied to the system in order to overcome potential energy barriers which prevent the propagation of ordering processes. Controllable sources of energy input identified to influence the assembly process include:

Acoustic excitation (amplitude, frequency, signal shape)
    Mechanical agitation of liquid surface (amplitude, frequency, direction)
    Electrostatic potentials (charged surfaces, dipoles)
    Fluid boundary layer conditions (air flow, drag forces)
    Surface energy
    Convective motion
    Centrifugal/Centripetal forces
    Bulk material/surface force vectors (direction of force exerted on spheres from fluid boundaries)

Energy is supplied to the floating spheres until the desired degree of ordering is observed, upon which time the input of energy is terminated. Typical assembly times vary from 15 minutes to approximately 1 hour and are dependent upon surface area of assembly and specific method of assembly employed.

Removal of Spheres Suspended in Bulk of Liquid (Optional): During the dispensing process, some fraction of spheres are introduced into the bulk of the liquid used for assembly. These spheres do not participate in the ordering process as they are below the surface where ordering occurs. After assembly and during transfer of assembled spheres to the desired substrate, suspended spheres are entrapped between the substrate and ordered monolayer, introducing three dimensional defects (termed 'triplets') in the finished assembly. To reduce these defects, suspended spheres may be removed by exchanging the liquid used during assembly with clean liquid prior to final deposition onto the desired substrate.

Solvent Anneal (Optional): After assembly and termination of energy input, an apparatus for injecting a compatible solvent vapor is utilized to solvent "weld" (fuse) individual spheres into a contiguous layer. The degree of solvent welding is controlled to allow spheres to fuse only at tangential points of contact between the spheres, and to maintain original sphere dimensions.

Deposition of Ordered Sphere Mono layer after Assembly: Spheres are transferred to desired substrate by controlled removal of the liquid used for sphere ordering. Removal is accomplished via several methods, including but not limited to: evaporation, draining using a valve incorporated into the system, and absorption by a suitable material. The ordering process is independent of the deposition process, allowing for deposition of the ordered monolayer of spheres onto most surfaces regardless of dimensions, surface topology, surface cross-sectional shape, and surface contact angle. Optionally, a compaction process may be employed in which a "squeegee" or suitable straight edge is placed into contact with the substrate surface and pushed laterally against the boundary of ordered spheres. This process can decrease spacing between the ordered spheres and improve the packing density.

B. Method: On-Wafer Assembly

A low-cost method requiring common laboratory equipment for large area assembly of micrometer- and nanometer-scale spheres is disclosed. This method for sphere assembly exhibits a wide process window which results in large area single domain (>6 cm diameter demonstrated) assemblies in time scales of less than one hour, and can be easily reproduced in most laboratory environments with a minimal investment in equipment and training, but the resulting ordered monolayer exhibits higher defect density than other methods disclosed. This method provides a universally accessible technique that produces ordered assemblies directly on a surface of interest at a scale not currently achievable and with defect densities acceptable for use in most laboratory and research environments. The dominant defects include stacking ("triplets"), point (missing spheres), and line (slight displacement of adjacent ordered areas resulting in a discontinuity in the form of a line of spheres not touching tangentially at three points). Of these defects, on-wafer assembly results in higher density of "triplet" stacking defects as compared to other methods of assembly.

The on-wafer assembly method utilizes the core process steps described in Section A. above, but uses further steps as well.

FIGS. 10A-10H demonstrate the process steps that are disclosed below for the On-Wafer Assembly process flow.

1. Substrate: any clean substrate may be used for the ordering process; of importance is the contact angle of water on the surface. Optimal contact angles are between that of a hydrophobic surface (CA>90°) and a hydrophilic surface (CA<90°). For reference, a 2" diameter substrate should require between 1 mL-3 mL of deionized water to cover the wafer from edge to edge; a contact angle which allows ~1 mL of water to completely, or substantially completely, cover the substrate is optimal.

2. Substrate Surface Preparation: substrate surface should be clean and particulate free. If the contact angle of the surface exceeds limits defined in Step 1, additional surface treatments, such as piranha etch, base piranha etch, partial hydroxylation with alcohols, oxygen/ozone plasma, UV light irradiation, etc. can be utilized to achieve required contact angle.

3. Sample Platform: The substrate is placed onto a level perforated platform that is elevated above a solid surface to allow air to flow above and below the sample; perforations in the platform introduce turbulence in the air as a mechanism for introducing energy to the system.

4. Dispense Liquid onto Substrate for Surface Assembly, as shown in FIG. 10A: FIG. 10A illustrates a clean substrate 1002 after dispensing deionized water, leaving a small area of substrate exposed for sphere solution dispensing. The liquid utilized must fulfil the density, viscosity, vapor pressure, and surface tension requirements for the spheres to be assembled. For example, deionized water is ideal for polystyrene as it has a higher density than the spheres with sufficient surface tension which promotes floating of spheres on the surface; the dispense solution has a different surface tension than water, which is also a requirement for proper assembly. Sufficient liquid must be dispensed onto the substrate to cover ~90% of the substrate surface.

5. Dispense Dilute Colloidal Sphere Solution onto Substrate (FIG. 10B): using a pipette or syringe, the sphere solution is dispensed onto the area of the substrate not covered with liquid. Typical quantities dispensed for a 2-inch diameter substrate is on the order of 3-10 µL, but can vary depending upon substrate size, dispense solution composition, and contact angle of the surface. Due to the difference in surface tension between the liquid used for floating the spheres and the dispense solution, the liquid on the surface is "pushed" away from the dispense solution (Marangoni Effect) (as shown in FIG. 10C). This receding of the liquid allows the dispensed spheres to spread out from the point of dispense; the rate of spread and drying rate are adjusted by the composition of the dispense solution, and are optimized to allow spheres to be dispersed as a thin layer in close proximity to the liquid on the surface, and the rate of evaporation determines the time required for the liquid to begin to reflow back to the original fill area. As the liquid returns, spheres are lifted onto the surface of the liquid and float (as shown in FIG. 10D). This process of dispense and float is repeated until approximately ⅔ of the liquid is covered with floating spheres (as shown in FIG. 10E).

6. Optimization (FIG. 10F): After loading the liquid surface with floating spheres, energy is supplied to the system to overcome local potential energy barriers and allow spheres to assemble into a periodic close-packed geometric arrangement. At a minimum, two forms of energy input are required for successful assembly:

Mechanical Vibrational Energy: the system is provided with low frequency (28-44 Hz), low amplitude (~1.5× $10^{-4}$ $m^2/s^3$) vibrational energy in x, y, and z directions. Transducers for inputting vibrational energy include piezoelectric devices, acoustic exciters, and mechanical vibrators.

Centrifugal/Centripetal Energy: air flow over the sample is directed over the sample with a gradient in face velocity (~20 fpm at surface of sample to ~85 fpm several inches above the sample) and in a manner which induces rotation of the floating sphere mass. Mechanisms for introducing this energy include: fume hoods, fans, mixing tables; rotation can be induced through mechanical barriers to direct airflow, fan vectoring, and nutation of mixing tables.

7. Depositing Assembled Spheres onto Substrate (FIGS. 10G-10H): After spheres have assembled to required dimension and quality, the assembled spheres on the liquid covering the substrate can be deposited onto the substrate via multiple methods:

Evaporation: the liquid is allowed to evaporate at room temperature or can be accelerated by elevating the temperature (below the Tg of the sphere material) on a hotplate or in an oven.

Wicking: utilizing a clean non-linting absorbent material (cleanroom wipe or equivalent, swab) to wick away excess liquid. This technique has the advantage of reducing suspended spheres which create "triplet" defects, but also requires careful control in order to minimize damage to the ordered domain due to potential physical contact with spheres.

FIG. 10G illustrates an approximately 75 mm domain. No grain boundaries are present in the large central domain, although "twisting" of the crystal is visible. FIG. 10H illustrates approximately 50 mm×80 mm rectangle, single domain with a lower degree of "twisting" relative to FIG. 10G. This indicates fewer defects in crystal.

C. Method: On-Wafer Assembly with Liquid Float Transfer

Figure 11A:
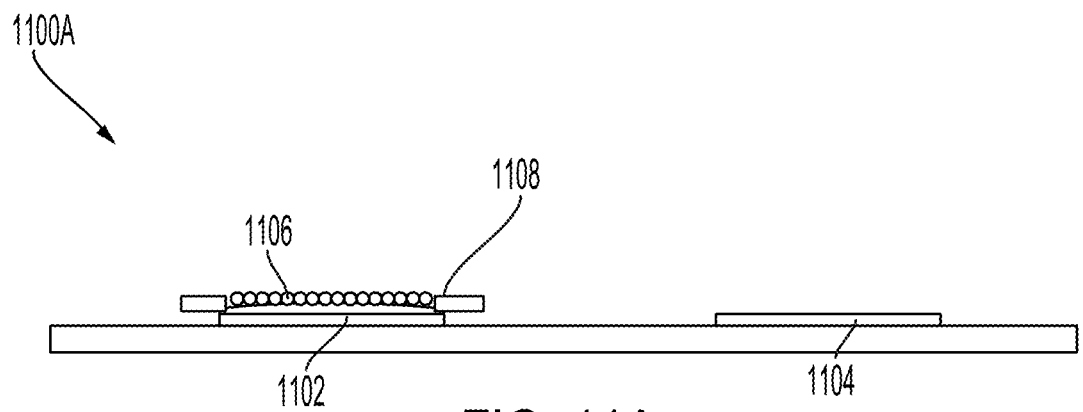
FIGS. 11A-11B illustrate a liquid float transfer setup and an on-wafer assembly setup, according to an example embodiment.

FIG. 11A shows an on-wafer assembly 1100A. As described in more detail below, the on-wafer assembly 1100A includes a first substrate 1102 and a second substrate 1104. Spheres 1106 on the first substrate 1102 are surrounded by a ring 1108. The ring 1108 can include materials such as Kapton, silicone, etc.

Figure 11B:
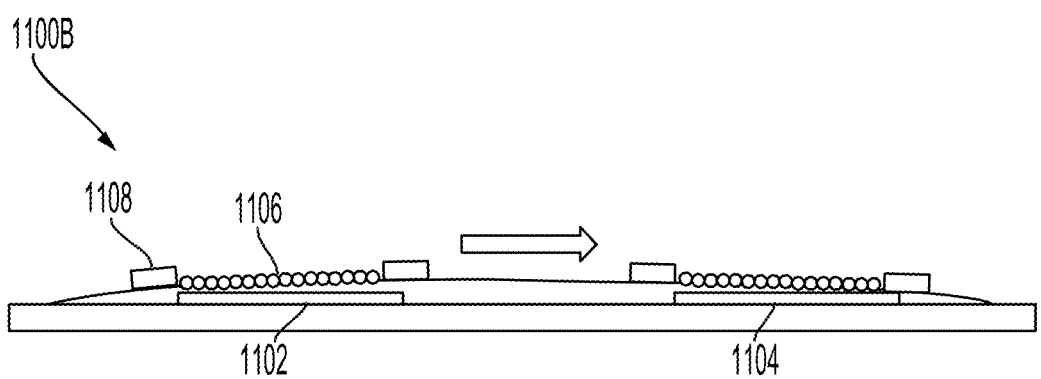

FIG. 11B shows the float transfer method 1100B. As shown in FIGS. 11A-11B, the Liquid Float Transfer method is substantially similar to On-Wafer Assembly, differing only in the last step of depositing the ordered domain onto the substrate surface. With On-Wafer Assembly, the liquid surface on which the spheres are floated and ordered is confined by the edges of the substrate onto which the ordered assembly will deposit.

The Liquid Float Transfer Method offers two mechanisms for improving the On-Wafer Assembly process:

Spheres can be deposited onto any substrate regardless of the surface contact angle, dimensions, surface topology, or overall geometry.

Suspended spheres are reduced in density via dilution of the liquid used for assembly after ordering is complete.

Spheres are deposited and optimized as in the On-Wafer Assembly Method up to and including step 6: Optimization (FIG. 11A). The method is modified as follows:

7. A retaining ring with an inside diameter smaller than the substrate diameter is applied to the substrate prior to dispensing water and sphere solution. The retaining ring is selected so as to float on the surface of water, and is utilized for stabilization of assembled spheres during the transfer process.

8. Dilution and Lift-Off: Spheres are ordered upon or transferred to a solid surface. Liquid of the same type as used for the ordering process is slowly and carefully added to the perimeter of the wafer until a sufficient amount has been added to allow the liquid to extend beyond the bounds of the substrate used for ordering. Additional liquid can continue to be added in order to dilute the density of spheres suspended in the liquid. Excess liquid can be removed as additional liquid is introduced to further dilute the suspended spheres.

9. Transfer Assembled Spheres (optional): a separate clean substrate is placed onto the transfer platform and additional liquid is added so that the second substrate is covered with liquid and extends beyond the bounds of the substrate. Liquid is continued to be added until a "bridge" forms, connecting the liquid pools from both substrates. The ordered assembly can be mechanically manipulated and moved across the liquid bridge to the clean substrate using the retaining ring.

10. Depositing Assembled Spheres onto Second Substrate: using the same technique described in Step 7 in the previous method, the assembled spheres can be deposited onto the second substrate. The retaining ring is removed after transfer.

D. Method: On-Water Assembly

On-Water assembly is an assembly technique and is an extension of the on-wafer method for sphere assembly optimized to allow for depositing ordered sphere assembly onto virtually any surface regardless of contact angle. In addition, defect density is reduced, virtually eliminating stacking defects (triplets). Optimized ordered grain defect density is limited by the Cv of spheres utilized; defects observed in assembled monolayer can each be attributed to an individual over-sized, under-sized, or misshaped sphere. However, the domain can exhibit "twist"; although the assembled spheres are arranged as a single contiguous domain, the typical round arrangement of the ordered domain can result in line defects, which over the large dimensions of the ordered domain appear as "waviness".

Figure 12:
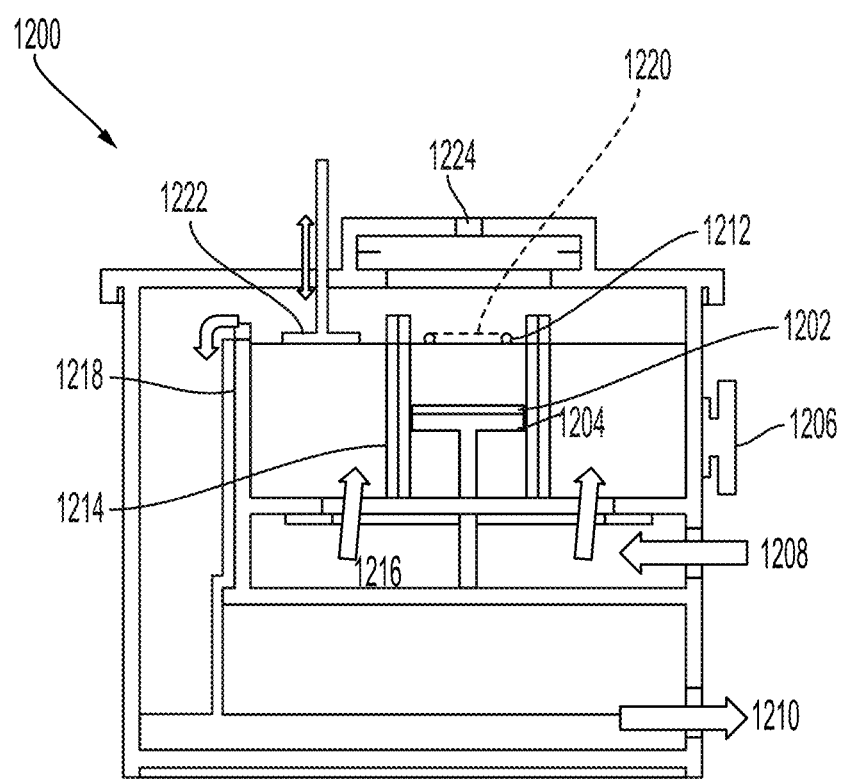
FIG. 12 illustrates an on-water assembly system, according to an example embodiment.

FIG. 12 illustrates an On-Water Assembly system and FIG. 13 illustrates retaining ring geometries used for dispensing spheres.

Referring to FIG. 12, an On-Water Assembly system 1200 includes a substrate 1202 mounted on a stand 1204 within a container 1218. The substrate 1202 and stand 1204 are submerged in a liquid, such as water, between vertical columns 1214. The liquid can be continually injected into the system 1200 by way of an inlet 1208 and removed from the system by way of an outlet 1210. The liquid can be injected into the substrate container by way injection pumps 1216. As described in more detail below, the spheres 1220 can be dispensed onto the surface of the water inside a retaining ring 1212.

In some examples, the On-Water Assembly system 1200 includes an acoustic exciter 1206 for agitating the water and spheres. The On-Water Assembly system 1200 can be used for On-Water Assembly in the method described below:

On-Water Assembly comprises the following apparatus and materials:

1. Container to hold water, with provisions for:
   a. A continuous flow of clean deionized water from the bottom controlled by a valve. Port dimensions and angle can be varied to induce various water flow patterns and are tuned to optimize assembly.
   b. An overflow and catch basin for collecting and draining water as it is flushed through the system.
   c. A mechanism for draining water from the assembly tank to allow deposition of assembled spheres onto a substrate submerged below the surface of water where assembly occurs (FIG. 8d).
   d. A holder with provisions for securing the substrate where assembled spheres will be deposited and positioning the substrate below the surface where assembly occurs (1204).
   e. A mechanism for maintaining the position of a ring used to retain spheres on the surface of the water during assembly.

2. Controlled energy input via a combination of one or more of the following mechanisms:
   a. A paddle (such as paddle 1222 consisting of a vertical rod attached to a horizontal plate). The paddle is positioned on the surface of the water, and is moved vertically in a periodic manner to agitate the surface of the water where spheres are assembled. The vertical displacement is variable and tuned to the sphere system, with typical values of 1 mm to 5 mm vertical travel at a rate of 0.25 Hz to 5 Hz.
   b. A paddle consisting of a horizontal bar attached to a vertical paddle. The paddle is positioned on the surface of the water, and is moved horizontally in a periodic manner to agitate the surface of the water vertically where spheres are assembled. The vertical displacement is variable and tuned to the sphere system, with typical values of 1 mm to 5 mm horizontal travel at a rate of 0.25 Hz to 5 Hz.
   c. One or more acoustic exciters 1206 mounted at various positions on the container. The exciter is driven using various waveforms, including but not limited to sinusoidal, pulsed, "heart beat", saw-tooth, square-wave, and white noise. Amplitude and frequency of signal is tuned to the sphere system; typical frequencies range from 1 Hz to 10 s of kHz.
   d. Manual physical motion induced by periodically tapping the sides of the container.

Figure 13A:
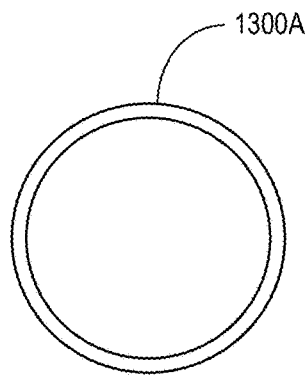
FIGS. 13A-13I illustrates retaining ring geometries, according to example embodiments.
Figure 13B:
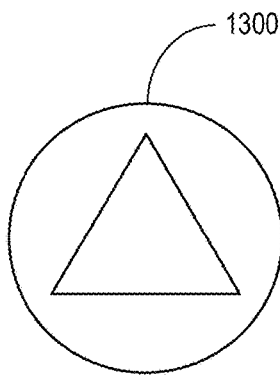
Figure 13C:
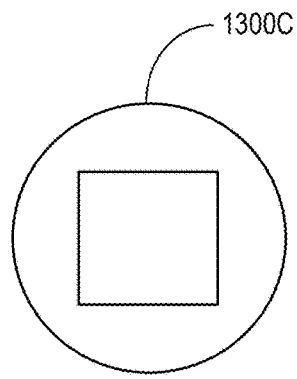
Figure 13D:
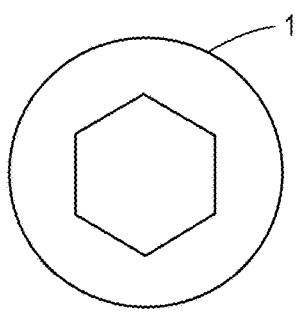
Figure 13E:
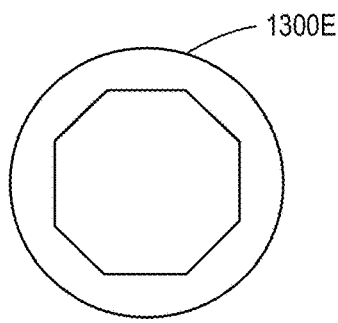
Figure 13F:
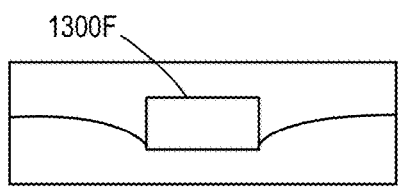
Figure 13G:
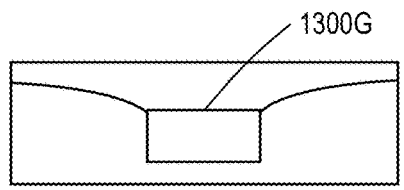
Figure 13H:
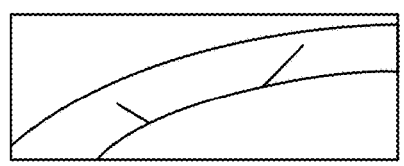
Figure 13I:
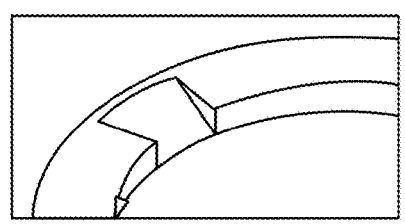

3. Sphere Retaining Ring (as shown in FIGS. 13A-13I). Sphere assembly requires a confined area for optimal assembly and to allow for positioning the assembled spheres during the deposition step.
   a. The retaining ring material and geometry is selected so that it floats on the surface of water. Materials utilized include, but are not limited to, polyimide film (for example, Kapton®), acrylic (for example, PMMA), acetal (for example, Delrin®), PTFE (for example, Teflon™), and silicone rubber (for example, PDMS).
   b. Retaining ring inner geometries include circular (1300A, as shown in FIG. 13A), triangular (1300B, as shown in FIG. 13B), rectangular (1300C, as shown in FIG. 13C), hexagonal (1300D, as shown in FIG. 13D), and octagonal (1300E, as shown in FIG. 13E).
   c. The ring can float either from the bottom (1300F, as shown in FIG. 13F) or top surface (1300G, as shown in FIG. 13G) of the material, and is determined by the density, geometry, contact angle of water with the material, and placement of the retaining ring onto the surface of the water. Floating position and contact angle is determined by the sphere system to be assembled, as both properties influence the force vectors of the water acting on the spheres.
   d. The retaining ring can be modified to facilitate dispensing the sphere solution. Sphere solution can be dispensed onto the surface of the ring; small cuts through thin retaining ring material (FIG. 13H) at various angles influence the direction and speed of the spheres as they float onto the water surface, and can be used to optimize the initial ordering process. For thicker materials, the retaining ring can be notched in a manner that creates a "ramp", where the bottom of the notch is in close proximity to the water surface (FIG. 13I). The dimensions and angle of the of the ramp can be adjusted to modify the apparent contact angle of the sphere solution with the water and can be utilized to influence the ratio of spheres which float on the surface of the liquid to spheres which go into suspension below the surface of the water.

4. Sphere Dispensing Solution. The sphere dispensing solution utilizes the same chemistries as used for the On-Wafer Assembly method, namely alcohols, glycols, and spheres suspended in deionized water. The On-Wafer Assembly sphere dispense solutions have proven to provide high quality sphere assembly. However, a higher concentration of glycols results in higher quality sphere assemblies. A specific formulation which demonstrates superior results is provided as an example: [3:1:1 propylene glycol:methanol: 10% w/v sphere solution].

Figure 14:
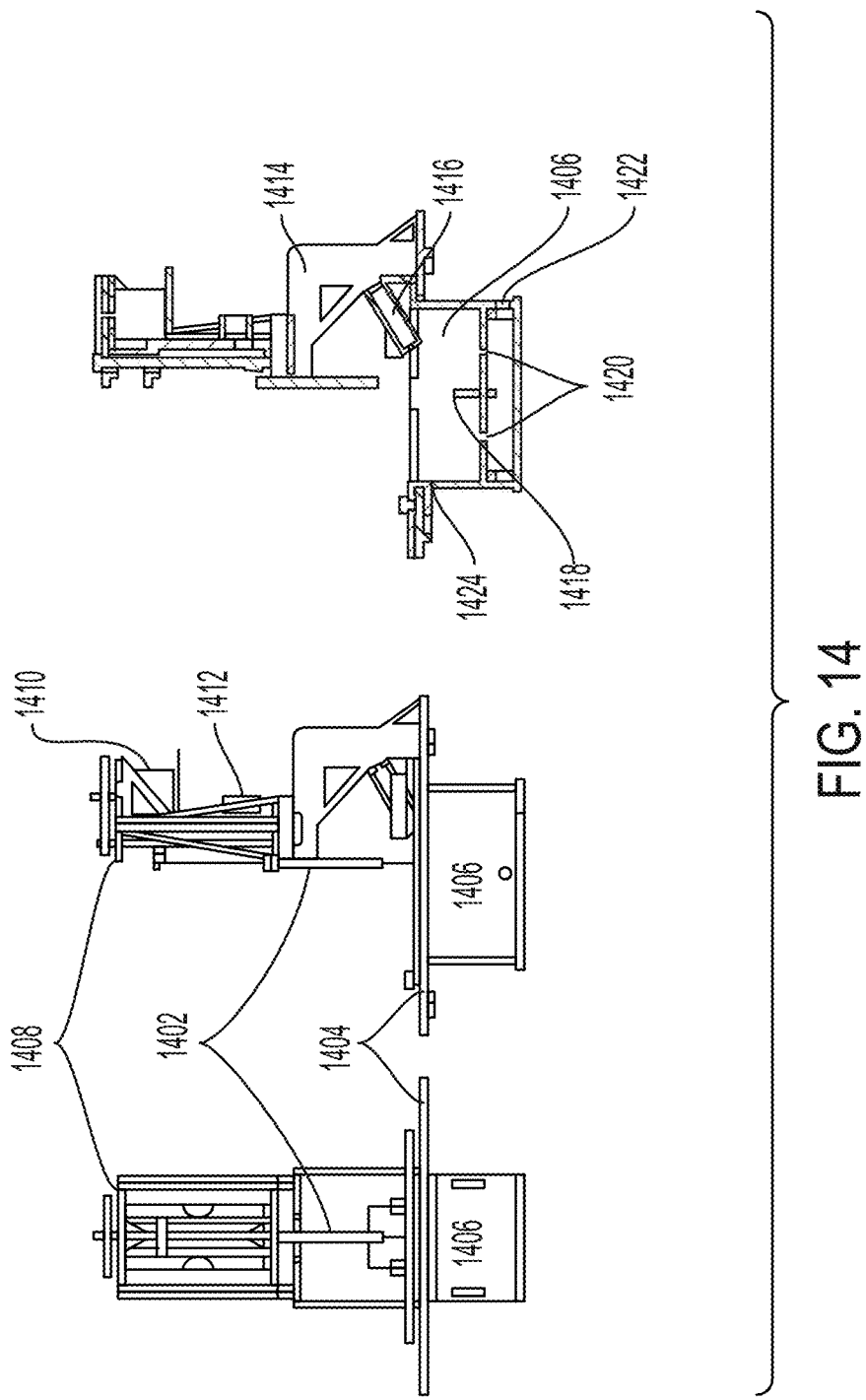
FIG. 14 illustrates an on-water ordered sphere assembly setup, according to an example embodiment.

5. Sphere Dispensing Method and Mechanism. The sphere solution is dispensed utilizing various methods as described below.
   a. Dispensing sphere solution directly onto the water using a pipette. This is a simple technique, but results in a high concentration of spheres going into suspension below the surface of the water and requires larger volumes of sphere solution to achieve the same grain dimensions relative to other techniques.
   b. Dispensing sphere solution directly onto the retaining ring. This technique requires the use of a very thin retaining ring, otherwise the spheres do not make contact with the surface of the water used for assembly. Results can be improved by cutting a partial line into the retaining ring which extends and is terminated by the interior edge of the ring. This promotes dispensing of the sphere solution through capillary action, much like the nib of a fountain pen. In addition, the angle of the line cut into the ring influences the initial assembly and can be optimized for specific spheres.
   c. Dispensing sphere solution onto notched retaining ring. For thicker retaining rings, a notch can be fabricated which downward toward the interior of the ring. This allows sphere solution to come into direct contact with the water surface. Contact angle of water with retaining ring material is critical and influences the ratio of spheres which float on the surface of water to spheres suspended below the surface of the water.
   d. Dispensing sphere solution directly onto water surface using a micro-syringe and syringe pump (FIG. 14). The syringe is mounted rigidly with provisions for adjusting x, y, and z position for optimizing dispensing efficacy and sphere assembly. Needle gage and shape (blunt, angled, etc.) are selected for optimal dispense and assembly based on sphere system.

The On-Water assembly method utilizes the core process steps described in Section A. above. The complete process sequence is disclosed below. A functional system with resulting on-water ordered sphere assembly 1400 is shown in FIG. 14.

An example on-water ordered sphere assembly 1400 includes a syringe 1402 above a support base 1404 and a trough 1406. The syringe is controlled by an automated system pump positioning/dispensing mechanism 1408. The automated system pump positioning/dispensing mechanism is attached to a syringe plunger motor for controlled rate of sphere solution dispensing 1410 and syringe positioning motors 1412 for placement of the syringe tip on the surface of the liquid. The on-water ordered sphere assembly 1400 may additionally include a syringe positioning base 1414. In some examples, an on-water ordered sphere assembly 1400 may additionally include an annealing solvent injector 1416. The on-water ordered sphere assembly 1400 further includes a sample pedestal 1418, as well as variable pitch water injection ports 1420, a water inlet 1422, and a water outlet 1424.

1. Initial Conditions. On-Water Assembly system drained and dry. Mount clean substrate onto substrate holder securely to prevent movement during subsequent procedures.

2. Fill Container with Deionized Water. Water is introduced at a controlled rate to fill the Assembly container. Water flow is adjusted to maintain a constant level with minimal disturbance of the surface.

3. Lower syringe tip until it is just touching the water surface without breaking the surface.

4. Using a syringe pump, sphere solution is dispensed onto the surface of the water at a rate of 5 µL/min-10 µL/min until desired area is covered.

5. After dispensing spheres, external energy sources are turned on and water flow is adjusted for optimal assembly conditions.

6. Allow spheres to self-assemble; typical ordering times are between 20 min-30 min. After optimal assembly is achieved, external energy sources and water flow are turned off.

7. Optional: Solvent Anneal Spheres utilizing vaporized solvent suitable for softening the sphere material. For polystyrene spheres, typical suitable solvents include, but are not limited to, toluene, methanol, methanol, methylene chloride. Solvent is placed into a clean bubbler using nitrogen as the carrier gas. The vaporized solvent is transported by clean tubing which is attached to the lid of the system (for example, lid 1224). The solvent vapor is applied for an appropriate time (typically ranging 30 seconds to 3 minutes) to soften the spheres and allow them to fuse together at points of contact. The solvent vapor is then removed from the system.

8. Deposit spheres onto substrate. The water drain valve is opened slowly to allow water level to lower in the container. The assembled spheres are positioned manually over the substrate as the water level approaches the level of the substrate surface. The assembled spheres deposit on the substrate surface; the remainder of the water in the container is allowed to drain from the system.

9. Drying and removal. The deposited sphere assembly is allowed to dry and the retaining ring is removed.

Compared to the Langmuir-Blodgett method, the method and apparatus disclosed herein provides additional degrees of control to facilitate the ordering process, including surface energy modification through the addition of more complex chemistries to manipulate the contact angle of the liquid on a surface, the surface tension of the liquid, lubricity and residence time of the liquid dispense solution on the surface, and controlled segregation and mixing of different liquids to facilitate dispensing the solution onto the liquid surface and provide mechanisms which promote/enhance the ordering process. In addition, the methods and apparatus disclosed also allow for controlled input of energy into the system to promote/enhance the ordering process, such as acoustic excitation, gas-liquid boundary layer drag forces, periodic perturbations of the liquid surface, convective and fluid motion of the liquid by selection of mixtures of liquids with appropriate evaporation rates, dynamic liquid flow patterns through the use of variable angle water inlet nozzles, centrifugal/centripetal forces from rotation of the liquid, potential energy barrier lowering between particles through the use of localized surface tension gradients induced by selection of specific chemistries, force-vector control of liquid through the use of containment rings and the manner in which the containment rings are floated on the surface of the liquid, and controlled gas flow velocity gradients above the surface of the liquid. The results of the Langmuir-Blodgett method and apparatus are inferior in both dimensional scale and defect density compared to the results utilizing the methods and apparatus disclosed To date, single-domain ordered sphere assembly has been limited to 10 mm diameter or smaller grains, with high defect densities. The methods and apparatuses disclosed herein include embodiments that demonstrate single-domain ordered sphere assemblies >80 mm diameter, the elimination of defects induced by the assembly method and apparatus, and theoretical minimum defect density achievable based on the quality of the spheres used for assembly—defects are induced only by misshaped spheres or the substrate geometry. The ordered single-domain sphere assemblies appear to scale linearly with substrate dimensions with the maximum grain diameter demonstrated to be approximately ⅔ of the diameter of the substrate irrespective of actual substrate dimension.

Unless otherwise explained, all technical and scientific terms used herein have the same meaning as commonly understood by one of ordinary skill in the art to which a disclosed disclosure belongs. The singular terms "a," "an," and "the" include plural referents unless context clearly indicates otherwise. Similarly, the word "or" is intended to include "and" unless the context clearly indicates otherwise. "Comprising" means "including"; hence, "comprising A or B" means "including A" or "including B" or "including A and B."

All references cited herein are hereby incorporated by reference to the extent not inconsistent with the disclosure herewith. Although the description herein contains many specificities, these should not be construed as limiting the scope of the disclosure but as merely providing illustrations of some of the presently preferred embodiments of the disclosure.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure. Thus, it should be understood that although the present disclosure has been specifically disclosed by preferred embodiments, exemplary embodiments and optional features, modification and variation of the concepts herein disclosed may be resorted to by those skilled in the art, and that such modifications and variations are considered to be within the scope of this disclosure as defined by the appended aspects. The specific embodiments provided herein are examples of useful embodiments of the present disclosure and it will be apparent to one skilled in the art that the present disclosure may be carried out using a large number of variations of the devices, device components, methods steps set forth in the present description. As will be obvious to one of skill in the art, methods and devices useful for the present methods can include a large number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the aspects herein.

Additional Examples

Silicon Wafer Surface Treatment: 100 mm silicon <100> wafers (500 µm thick) are RCA cleaned and stored in an ISO 1000 cleanroom environment for 120 hours. The resultant hydrocarbon deposition on the silicon oxide surface leads to an increase in water contact angle to ~40°. The silicon wafers are degreased before use.

Colloidal Solution: The colloidal solution is prepared by mixing 5:15:15:10:1 parts of deionized water:propylene glycol:isopropanol:10% wt. 1 µm polystyrene spheres (Alfa Aesar Inc.):methanol respectively. The solution is ultrasonicated for 10 minutes before use.

Colloidal Mask Fabrication: The surface-treated silicon wafer is placed inside the purpose-built colloidal assembly setup shown in FIG. 1a. The front-open setup enclosure is cut from 3/16" thick acrylic sheets (Mcmaster Carr Inc.) using a laser cutter and glued together. The setup enclosure also houses an inlet fan (Thermaltake CPU fan) located on the back wall and an acoustic exciter (Dayton Audio 40 W 4Ω subwoofer) located next to the wafer bench. The silicon wafer is coated with 10-11 ml of deionized water leaving a small edge pocket to serve as the solution dispense site. A colloidal solution volume of 105 µl is slowly dispensed using a pipette at the edge dispense site over 60 minutes. After the dispense of the first solution droplet, the external energy sources are switched on. The air velocity at the face of the fan is set at 2.5-2.6 m/s. The acoustic exciter is driven using a function generator with 44 Hz, 1 Vpp and 5 ms square pulses. Following the solution addition process, the colloidal crystal is allowed to optimize for 210 minutes. Finally, the colloidal crystal is extracted by breaking the water surface tension using a 6"×6" Texwipe. The colloidal crystal is allowed to dry in air for a few hours before moving the substrate.

Solvent Annealing: Optimized colloidal crystals are solvent treated for 30 minutes using the home-built solvent annealing box. Tricholoroethylene is inlet into the solvent annealing box by bubbling nitrogen gas at 2 scfh through a glass bubbler containing Weld-On 4 acrylic glue. The solvent annealing box screen mesh porosity is set at 0.64 and the hexagonal pipe length is set at 7 times the pipe diameter. These parameters ensure a slow gravity-assisted laminar flow for the solvent vapor. The crystal is extracted using the same procedure listed above.

Microscopy: The interfacial assembly is performed on a silicon wafer placed on the microscope stage of an Olympus BH2 optical microscope. In the colloidal solution loading process, as detailed in FIG. 3, scans are acquired at 250× magnification.

Defect Measurement and Analysis: Large area (6144× 4415 pixel density) scanning electron microscopy scans are obtained at random points in the quasi single crystals using the FEI Quanta FEG 450 ESEM. The scan parameters are high-vac mode ($10^{-6}$ torr), 10 kV accelerating voltage, Everhart-Thornley secondary electron detector, ~5 mm working distance, 800× magnification, 20 µs dwell time and 3.0 spot size. Samples are not coated with a metal layer for SEM imaging.

Image processing is performed on the large area SEM scans to determine the lithographic defective area for nanosphere lithography processes using the quasi single crystals. The SEM scans are processed with a circular Hough transform and Delaunay triangulation to create a triangular mesh connecting the sphere centers. The center-to-center links in the triangular mesh are measured against a range of 105 nm around the mean sphere diameter. If this condition is not met, then the triangle with the defective link is marked defective as a whole. Subsequently, the total defective area of the large area SEM is computed by the sum of the areas of the defective triangles.

Twist Measurement and Analysis: The large area twist measurement setup is shown in FIG. 7. The silicon wafer with the inch-scale quasi single crystal is rested on a manual microscope XY-stage. A Melles Griot 5 mW HeNe laser is mounted vertically, approximately 40 cm above the microscope stage, pointing downwards. A white paper screen with a circular hole, 4 mm in diameter, is fixed 5 mm above the microscope stage in such a way that the HeNe laser beam passes exactly through the 4 mm hole in the screen. The silicon wafer, sitting on the microscope stage, is the only moving object in the described experimental setup. A single lens and a Point Grey CCD camera are mounted above the screen and capture ~20 mm×20 mm of the central screen area onto the camera.

A transformation function is applied to the captured spot patterns to account for the camera tilt. Subsequently, a ring enclosing the hexagonal spots is spliced along the θ polar coordinate. The six-spot pattern leads to six peaks in the intensity vs θ coordinate graph. Finally, the twist in the crystal is determined by the change in the θ coordinate of a chosen single spot as the laser moves through the colloidal crystal.

Although the present disclosure has been described with reference to certain embodiments thereof, other embodiments are possible without departing from the present disclosure. The spirit and scope of the appended aspects should not be limited, therefore, to the description of the preferred embodiments contained herein. All embodiments that come within the meaning of the aspects, either literally or by equivalence, are intended to be embraced therein. Furthermore, the advantages described above are not necessarily the only advantages of the disclosure, and it is not necessarily expected that all of the described advantages will be achieved with every embodiment of the disclosure.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of assembling a colloidal crystal, the method comprising:
dispensing a first liquid onto a first portion of a surface of a first substrate;
dispensing a solution comprising colloidal spheres onto a second portion of the surface of the first substrate;

agitating the colloidal spheres so as to disperse the colloidal spheres along the first portion and the second portion of the surface of the first substrate;

directing air flow above the colloidal spheres inducing rotation of the colloidal spheres;

transferring the colloidal spheres from the first substrate to a second substrate, wherein the first substrate and second substrate are mounted on a platform, wherein transferring the colloidal spheres from the first substrate to the second substrate comprises:

adding a second liquid to the platform, such that the colloidal spheres float on the second liquid above the first substrate; and moving the colloidal spheres along the surface of the second liquid such that the colloidal spheres are above the second substrate.

2. The method of claim 1, further comprising a retaining ring positioned on the surface of the first substrate, and wherein the first portion and second portion of the surface of the first substrate are at least partially surrounded by the retaining ring.

3. The method of claim 2, wherein moving the colloidal spheres along the surface of the second liquid such that the colloidal spheres are above the second substrate comprises moving the retaining ring along the surface of the second liquid such that the retaining ring and the colloidal spheres are above the second substrate.

4. The method of claim 1, further comprising removing the second liquid from the platform.

5. The method of claim 1, wherein agitating the spheres comprises applying acoustic agitation.

6. The method of claim 1, wherein agitating the spheres comprises mechanical agitation of a surface of the first liquid.

7. The method of claim 1, wherein the colloidal spheres are nanospheres.

8. The method of claim 1, wherein the colloidal spheres are microspheres.

9. The method of claim 1, wherein the colloidal spheres comprises polystyrene.

10. The method of claim 1, wherein the solution comprising colloidal spheres also comprises at least one of: Acetone, Isopropanol, Methanol, Ethanol, Ethylene Glycol, Propylene Glycol, Glycerol, and Deionized water.

11. The method of claim 1, wherein the first liquid comprises deionized water.

12. The method of claim 1, wherein the second portion of the surface of the first substrate comprises an edge of the surface of the first substrate.

* * * * *